(12) United States Patent
Yoneda

(10) Patent No.: US 6,233,390 B1
(45) Date of Patent: *May 15, 2001

(54) APPARATUS AND METHOD FOR RECORDING AND REPRODUCING DATA

(75) Inventor: Yasushi Yoneda, Ikeda (JP)

(73) Assignee: Matsushita Electric Industrial Co., Ltd., Kadoma (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/133,436

(22) Filed: Aug. 13, 1998

Related U.S. Application Data

(62) Division of application No. 08/596,459, filed on Feb. 5, 1996, now Pat. No. 6,002,832.

(30) Foreign Application Priority Data

Feb. 9, 1995 (JP) ......................................... 7-46370

(51) Int. Cl.$^7$ ..................................................... H04N 5/76
(52) U.S. Cl. ................................................ 386/46; 386/95
(58) Field of Search ............................... 386/46, 109, 112, 386/83, 95, 125, 126, 111; H04N 5/76

(56) References Cited

U.S. PATENT DOCUMENTS

| | | |
|---|---|---|
| 4,845,564 | 7/1989 | Hakamada et al. . |
| 5,134,499 | * 7/1992 | Sata et al. .............................. 386/109 |
| 5,187,589 | * 2/1993 | Kono et al. ............................. 386/83 |
| 5,270,828 | 12/1993 | Mozi . |
| 5,355,353 | 10/1994 | Kaiho . |
| 5,371,551 | 12/1994 | Logan et al. . |
| 5,523,851 | 6/1996 | Leshem . |
| 5,555,463 | 9/1996 | Staron . |

FOREIGN PATENT DOCUMENTS

| | | |
|---|---|---|
| 0447293 | 9/1991 | (EP) . |
| 0521454 | 1/1993 | (EP) . |
| 0552806 | 7/1993 | (EP) . |
| 0594241 | 4/1994 | (EP) . |
| 0606868 | 7/1994 | (EP) . |
| 0626787 | 11/1994 | (EP) . |
| 2700908 | 7/1993 | (FR) . |
| 0620443 | 1/1994 | (JP) . |
| 6022273 | 1/1994 | (JP) . |
| 6046366 | 2/1994 | (JP) . |
| 6233234 | 8/1994 | (JP) . |
| 6326961 | 11/1994 | (JP) . |
| 7030851 | 1/1995 | (JP) . |
| 0297894 | 7/1995 | (TW) . |
| 9113695 | 9/1991 | (WO) . |
| 92/22983 | * 12/1992 | (WO) . |

OTHER PUBLICATIONS

European Search Report for Application No. 96101743.1 mailed Jan. 14, 1997.

* cited by examiner

Primary Examiner—Huy Nguyen
(74) Attorney, Agent, or Firm—Renner, Otto, Boisselle & Sklar

(57) ABSTRACT

The apparatus for recording and reproducing data according to the present invention includes: a receiving section for receiving input data; a recording section for recording the input data on a recording medium; a managing section for managing information indicating a position of the input data recorded on the recording medium; a reproducing section for reproducing the data recorded on the recording medium based on the information managed by the managing means during recording of the input data on the recording medium; and a selective output section for selectively outputting at least one of the input data and the data reproduced by the reproducing section.

8 Claims, 15 Drawing Sheets

APPARATUS AND METHOD FOR RECORDING AND REPRODUCING DATA

This is a division of application U.S. Ser. No. 08/596,459, filed Feb. 5, 1996, U.S. Pat. No. 6,002,832.

BACKGROUND OF THE INVENTION

1. Field of the Invention

The present invention relates to an apparatus and a method for recording and reproducing video and sound for providing a "time-shift reproduction" function and a "time-shift fast-forward reproduction" function.

2. Description of the Related Art

In recent years, the popularization of satellite broadcasting, CATVs and the like has caused a considerable increase in the number of broadcasting channels. As a result, very frequently TV audiences want to watch several TV programs broadcasted in the same time period. Moreover, home-use video apparatuses have also been popularized. Therefore, it is desirable to develop a method for utilizing such apparatuses more efficiently.

FIG. 16 shows an exemplary conventional apparatus for recording and reproducing video and sound, in which a TV set is connected with a video cassette recorder (VCR).

Hereinafter, the respective components shown in FIG. 16 will be described.

Broadcast receiving sections 1 and 2 receive a broadcast. Typically, the broadcast receiving section 1 is a tuner incorporated into a TV set, and the broadcast receiving section 2 is a tuner incorporated into a VCR.

A video/sound recording section 3 converts the video and the sound output from the broadcast receiving section 2 into a recording signal so as to record the recording signal on a magnetic tape. The magnetic tape is driven by a magnetic tape driving section 4.

A video/sound reproducing section 5 converts the recording signal recorded on the magnetic tape, thereby reproducing the video and the sound. The video and the sound reproduced by the video/sound reproducing section 5 are supplied to a selective output section 6.

The selective output section 6 selectively outputs one of the output from the broadcast receiving section 1 and the output from the video/sound reproducing section 5. The selection in the selective output section 6 is manually determined by a user.

A video display section 7 displays the video selected by the selective output section 6. A sound output section 8 outputs the sound selected by the selective output section 6.

However, in order to reproduce a program now being recorded, a conventional apparatus having the above-described configuration is required to suspend the recording operation once, rewind the magnetic tape and then start the reproducing operation. Therefore, such an apparatus has the following problems.

(1) During recording of a program which is now being broadcasted, it is impossible to reproduce the program from the beginning while continuing recording of the program.

(2) In the case where watching and listening of a program now being broadcasted must be suspended, it is impossible to reproduce the program from the point at which watching and listening of the program was suspended while continuing recording of the program.

(3) In the case where watching and listening of a program now being broadcasted must be suspended, it is impossible to fast-forward reproduce the program from the point at which watching and listening of the program was suspended while continuing recording of the program.

In addition, it is impossible for a conventional apparatus to simultaneously record a plurality of programs on one and the same magnetic tape. Therefore, in order to simultaneously record a plurality of programs, it has been necessary to provide the same number of recording and reproducing apparatuses as the number of programs.

SUMMARY OF THE INVENTION

According to one aspect of the present invention, an apparatus for recording and reproducing data is provided. The apparatus includes: receiving means for receiving input data; recording means for recording the input data on a recording medium; managing means for managing information indicating a position of the input data recorded on the recording medium; reproducing means for reproducing the data recorded on the recording medium, based on the information managed by the managing means during recording of the input data on the recording medium; and selective output means for selectively outputting at least one of the input data and the data reproduced by the reproducing means.

According to another aspect of the present invention, an apparatus for recording and reproducing data of a plurality of channels is provided. The apparatus includes: receiving means for receiving input data of a N number of channels; first selection means for selecting a M number of channels among the N number of channels; recording means for recording on a recording medium the input data of the M number of channels selected by the first selection means; managing means for managing information indicating a position of the input data of the M number of channels recorded on the recording medium; second selection means for selecting a P number of channels among a plurality of channels recorded on the recording medium; reproducing means for reproducing the data of the P number of channels selected by the second selection means among the plurality of channels recorded on the recording medium, based on the information managed by the managing means, during recording of the input data of the M number of channels on the recording medium; and selective output means for selectively outputting at least one of the input data of the N number of channels and the data of the P number of channels reproduced by the reproducing means, where N, M and P are positive integers and $N \geq M$.

In one embodiment, the apparatus further includes compression means for compressing the input data and expansion means for expanding the data reproduced by the reproducing means.

In another embodiment, the selective output means includes means for applying a priority order to each of the input data and the reproduced data, and the apparatus further includes display means for displaying an output from the selective output means in a predetermined mode, the predetermined mode being changed in accordance with the priority order.

According to still another aspect of the present invention, an apparatus for recording and reproducing data is provided. The apparatus includes: receiving means for receiving input data; time code generating means for generating a time code and applying the time code to the input data; thin-out means for thinning out the input data with the time code at a predetermined ratio; recording means for recording on a recording medium the input data with the time code which have been thinned out by the thin-out means; managing means for managing information indicating a position of the input data with the time code recorded on the recording medium; reproducing means for reproducing the data with the time code recorded on the recording medium, based on the information managed by the managing means, during recording of the input data with the time code on the recording medium; comparing means for comparing the time code of the input data with the time code of the data reproduced by the reproducing means; and selective output means for selectively outputting at least one of the input data and the data reproduced by the reproducing means based on a comparison result obtained by the comparing means.

In one embodiment, the apparatus further includes compression means for compressing the input data with the time code which have been thinned out by the thin-out means and expansion means for expanding the data with the time code which have been reproduced by the reproducing means.

In another embodiment, the selective output means includes means for applying a priority order to each of the input data with the time code and the reproduced data with the time code, and the apparatus further includes display means for displaying an output from the selective output means in a predetermined mode, the predetermined mode being changed in accordance with the priority order.

According to still another aspect of the present invention, an apparatus for recording and reproducing data is provided. The apparatus includes: receiving means for receiving input data; time code generating means for generating a time code and applying the time code to the input data; recording means for recording on a recording medium the input data with the time code; managing means for managing information indicating a position of the input data with the time code recorded on the recording medium; reproducing means for reproducing the data with the time code recorded on the recording medium, based on the information managed by the managing means, during recording of the input data with the time code on the recording medium; thin-out means for thinning out the data with the time code reproduced by the reproducing means at a predetermined ratio; comparing means for comparing the time code of the input data with the time code of the data thinned out by the thin-out means; and selective output means for selectively outputting at least one of the input data and the data thinned out by the thin-out means based on a comparison result obtained by the comparing means.

In one embodiment, the apparatus further includes compression means for compressing the input data with the time code and expansion means for expanding the data with the time code which have been reproduced by the reproducing means.

According to still another aspect of the present invention, an apparatus for recording and reproducing data is provided. The apparatus includes: receiving means for receiving input data; time code generating means for generating a time code and applying the time code to the input data; first thin-out means for thinning out the input data with the time code at a first ratio; recording means for recording on a recording medium the input data with the time code which have been thinned out by the first thin-out means; managing means for managing information indicating a position of the input data with the time code recorded on the recording medium; reproducing means for reproducing the data with the time code recorded on the recording medium, based on the information managed by the managing means, during recording of the input data with the time code on the recording medium; second thin-out means for thinning out the data with the time code reproduced by the reproducing means at a second ratio; comparing means for comparing the time code of the input data with the time code of the data thinned out by the second thin-out means; and selective output means for selectively outputting at least one of the input data and the data thinned out by the second thin-out means based on a comparison result obtained by the comparing means.

In one embodiment, the apparatus further includes compression means for compressing the input data with the time code which have been thinned out by the first thinout means and expansion means for expanding the data with the time code which have been reproduced by the reproducing means.

In another embodiment, the selective output means includes means for applying a priority order to each of the input data with the time code and the thinned out data with the time code, and the apparatus further includes display means for displaying an output from the selective output means in a predetermined mode, the predetermined mode being changed in accordance with the priority order.

According to still another aspect of the present invention, a method for recording and reproducing data is provided. The method includes the steps of: (a) receiving input data; (b) recording the input data on a recording medium; (c) managing information indicating a position of the input data recorded on the recording medium; (d) reproducing the data recorded on the recording medium, based on the information managed in the step (c), during recording of the input data on the recording medium; and (e) selectively outputting at least one of the input data and the data reproduced in the step (d).

In one embodiment, the step (e) includes a step of applying a priority order to each of the input data and the reproduced data, and the method further includes a step of displaying the selective output in the step (e) in a predetermined mode, the predetermined mode being changed in accordance with the priority order.

According to still another aspect of the present invention, a method for recording and reproducing data of a plurality of channels is provided. The method includes the steps of: (a) receiving input data of a N number of channels; (b) selecting a M number of channels among the N number of channels; (c) recording on a recording medium the input data of the M number of channels selected in the step (b); (d) managing information indicating a position of the input data of the M number of channels recorded on the recording medium; (e) selecting a P number of channels among a plurality of channels recorded on the recording medium; (f) reproducing the data of the P number of channels selected in the step (e) among the plurality of channels recorded on the recording medium, based on the information managed in the step (d), during recording of the input data of the M number of channels on the recording medium; and (g) selectively outputting at least one of the input data of the N number of channels and the reproduced data of the P number of channels, where N, M and P are positive integers and $N \geq M$.

In one embodiment, the method further includes a step of compressing the input data and a step of expanding the reproduced data.

In another embodiment, the step (g) includes a step of applying a priority order to each of the input data and the reproduced data, and the method further includes a step of displaying the selective output in the step (g) in a predetermined mode, the predetermined mode being changed in accordance with the priority order.

According to still another aspect of the present invention, a method for recording and reproducing data is provided. The method includes the steps of: (a) receiving input data; (b) generating a time code and applying the time code to the input data; (c) thinning out the input data with the time code at a predetermined ratio; (d) recording on a recording medium the input data with the time code which have been thinned out in the step (c); (e) managing information indicating a position of the input data with the time code recorded on the recording medium; (f) reproducing the data with the time code recorded on the recording medium, based on the information managed in the step (e), during recording of the input data with the time code on the recording medium; (g) comparing the time code of the input data with the time code of the data reproduced in the step (f); and (h) selectively outputting at least one of the input data and the reproduced data based on a comparison result obtained in the step (g).

In one embodiment, the method further includes a step of compressing the input data with the time code which have been thinned out in the step (c) and a step of expanding the data with the time code which have been reproduced in the step (f).

In another embodiment, the step (h) includes a step of applying a priority order to each of the input data with the time code and the reproduced data with the time code, and the method further includes a step of displaying the selective output in the step (h) in a predetermined mode, the predetermined mode being changed in accordance with the priority order.

According to still another aspect of the present invention, a method for recording and reproducing data is provided. The method includes the steps of: (a) receiving input data; (b) generating a time code and applying the time code to the input data; (c) recording on a recording medium the input data with the time code; (d) managing information indicating a position of the input data with the time code recorded on the recording medium; (e) reproducing the data with the time code recorded on the recording medium, based on the information managed in the step (d), during recording of the input data with the time code on the recording medium; (f) thinning out the data with the time code reproduced in the step (e) at a predetermined ratio; (g) comparing the time code of the input data with the time code of the data thinned out in the step (f); and (h) selectively outputting at least one of the input data and the data thinned out in the step (f) based on a comparison result obtained in the step (g).

In one embodiment, the method further includes a step of compressing the input data with the time code and a step of expanding the data with the time code which have been reproduced in the step (e).

In another embodiment, the step (h) includes a step of applying a priority order to each of the input data with the time code and the thinned out data with the time code, and the method further includes a step of displaying the selective output in the step (h) in a predetermined mode, the predetermined mode being changed in accordance with the priority order.

According to still another aspect of the present invention, a method for recording and reproducing data is provided. The method includes the steps of: (a) receiving input data; (b) generating a time code and applying the time code to the input data; (c) thinning out the input data with the time code at a first ratio; (d) recording on a recording medium the input data with the time code which have been thinned out in the step (c); (e) managing information indicating a position of the input data with the time code recorded on the recording medium; (f) reproducing the data with the time code recorded on the recording medium, based on the information managed in the step (e), during recording of the input data with the time code on the recording medium; (g) thinning out the data with the time code reproduced in the step (f) at a second ratio; (h) comparing the time code of the input data with the time code of the data thinned out in the step (g); and (i) selectively outputting at least one of the input data and the data thinned out in the step (g) based on a comparison result obtained in the step (h).

In one embodiment, the method further includes a step of compressing the input data with the time code which have been thinned out in the step (c) and a step of expanding the data with the time code which have been reproduced in the step (f).

In another embodiment, the step (i) includes a step of applying a priority order to each of the input data with the time code and the thinned out data with the time code, and the method further includes a step of displaying the selective output in the step (i) in a predetermined mode, the predetermined mode being changed in accordance with the priority order.

Thus, the invention described herein makes possible the advantages of (a) providing a recording/reproducing apparatus and method which provides a "time-shift reproduction" function for solving the above-mentioned problems (1) and (2) and a "time-shift fast-forward reproduction" function for solving the above-mentioned problem (3); and (b) providing a recording/reproducing apparatus and method capable of simultaneously recording and reproducing data from a plurality of channels.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

EXAMPLE 1

Figure 1:
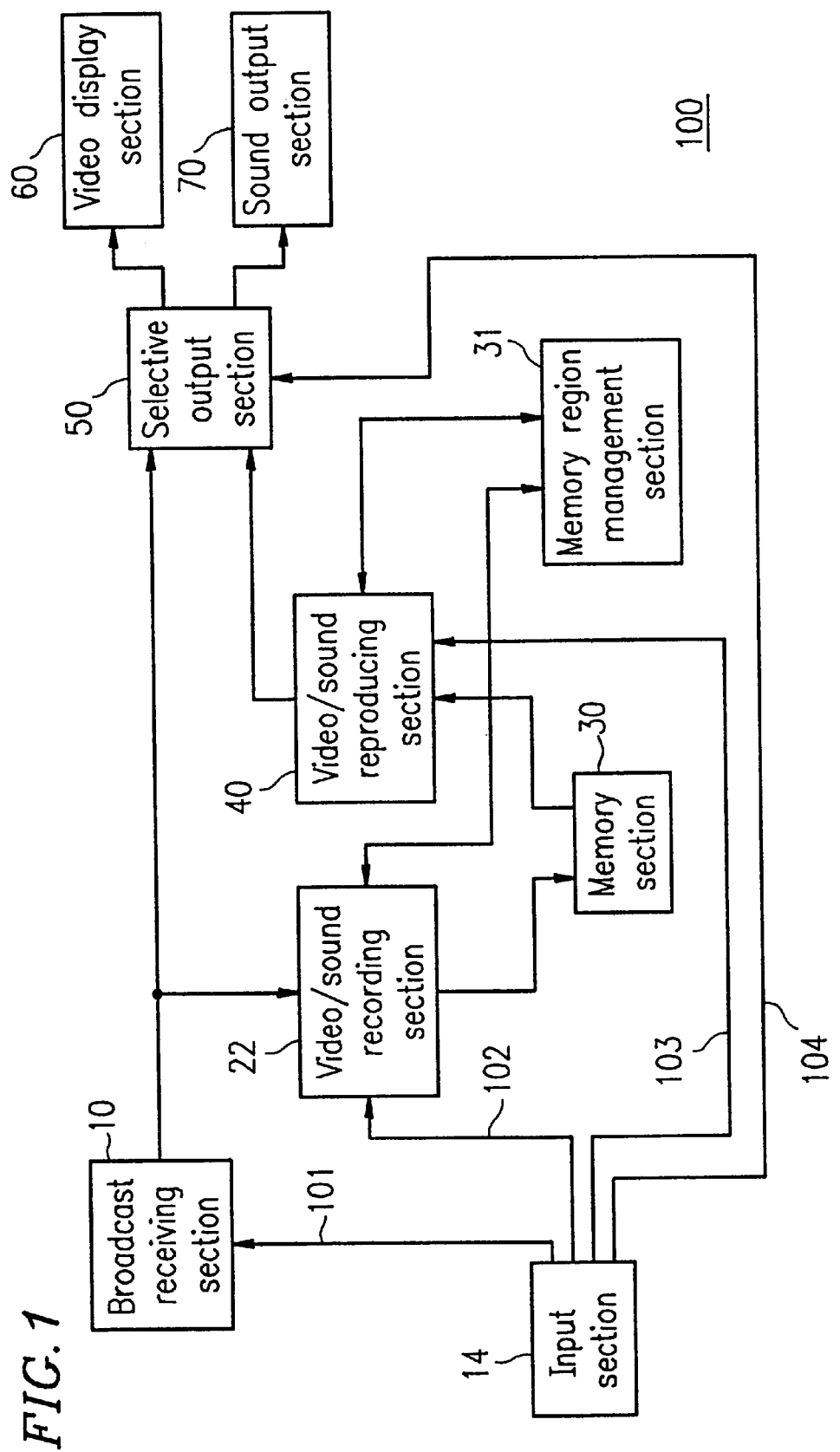
FIG. 1 is a block diagram showing a configuration for an apparatus 100 for recording and reproducing video and sound according to a first example of the present invention.

FIG. 1 shows a configuration for an apparatus 100 for recording and reproducing video and sound according to a first example of the present invention. The apparatus 100 has a "time-shift reproduction" function. The "time-shift reproduction" function is herein defined as a function of, during recording of a program which is now being broadcasted, reproducing the program from the beginning while continuing recording of the program.

For example, the "time-shift reproduction" function is effectively applicable to a case where a first half of a program is desired to be watched again while continuing recording of the second half of the program. A user can reproduce the first half of the program from the beginning without waiting for the completion of recording of the second half of the program.

In addition, the "time-shift reproduction" function is also effectively applicable to a case where a program is to be recorded from nine p.m. to eleven p.m. using a preset timer during the user's absence (such a recording will be referred to as an "absence recording"); the user comes home at a time during the absence recording (for example, at nine-thirty); and the user wants to start to reproduce the absence-recorded program before eleven o'clock. The user can reproduce the absence-recorded program from the beginning without waiting for the completion of recording of the program.

Moreover, the "time-shift reproduction" function is also effectively applicable to a case where watching and listening of a program now being broadcasted must be suspended and a user later wants to restart watching and listening to the program from the point at which watching and listening of the program was suspended. The user can reproduce the program from the point at which watching and listening of the program was suspended without waiting for the completion of recording of the program.

Hereinafter, the respective components of the apparatus 100 will be described with reference to FIG. 1.

A broadcast receiving section 10 receives a broadcast of video and sound. In general, the broadcast receiving section 10 is configured so as to receive broadcasts of a plurality of channels. The broadcast receiving section 10 selects one channel from a plurality of channels in response to a channel selection signal supplied from an input section 14, so as to output video and sound corresponding to the selected channel to a video/sound recording section 22 and a selective output section 50. The channel selection signal is input from the input section 14 to the broadcast receiving section 10 via a line 101.

The video/sound recording section 22 inquires of a memory region management section 31 where the video and the sound supplied from the broadcast receiving section 10 are to be recorded in a memory section 30, and obtains information indicating a position at which the video and the sound are to be recorded as a reply to the inquiry. The video/sound recording section 22 records the video and the sound at the position indicated by the information in the memory section 30. This positional information is determined by the memory region management section 31, and is referred to when a time-shift reproduction is made by a video/sound reproducing section 40, as will be described later. This positional information is, for example, an address on a recording medium.

A recording start signal, a recording end signal and a time-shift reproduction end signal are input from the input section 14 to the video/sound recording section 22 via a line 102. The video/sound recording section 22 starts a recording operation in response to the recording start signal, and ends the recording operation in response to the recording end signal or the time-shift reproduction end signal.

The memory section 30 has a function of performing the reproduction operation of the video and the sound recorded in the memory section 30 in parallel with performing the recording operation of video and sound in the memory section 30. For example, the memory section 30 may be an optical disk driving apparatus having a recording head and a reproducing head which can be driven independently from each other, or a hard disk driving apparatus including a plurality of such heads.

Figure 2:
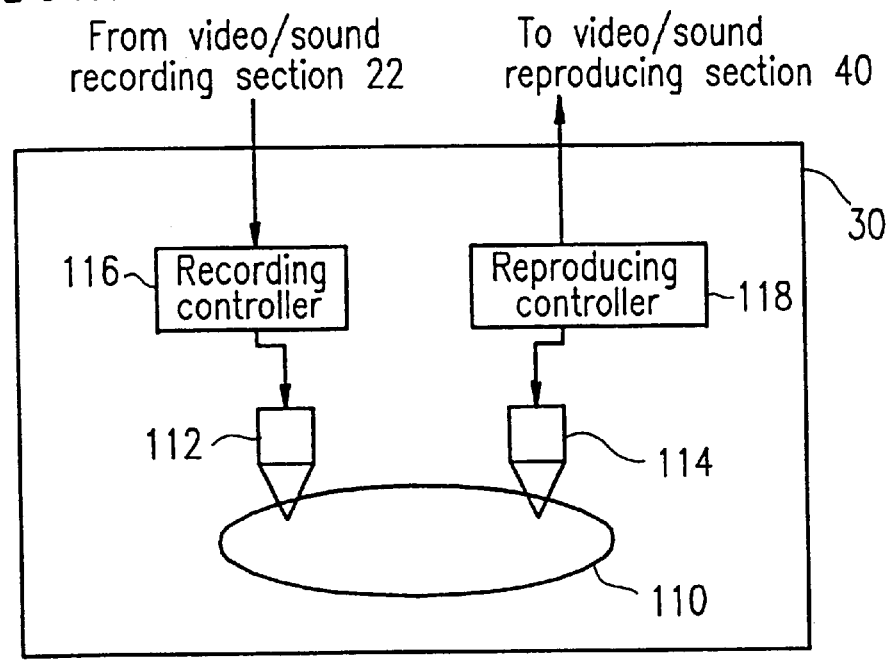
FIG. 2 is a diagram showing a specific configuration for the memory section 30 in the apparatus 100.

FIG. 2 shows a specific configuration for the memory section 30. The memory section 30 includes: a recording head 112 for recording data on a recording medium 110; a reproducing head 114 for reproducing the data recorded on the recording medium 110; a recording controller 116 for controlling the recording head 112; and a reproducing controller 118 for controlling the reproducing head 114.

The recording controller 116 receives data to be written on the recording medium 110 and the information, e.g., an address on the recording medium 110, indicating a position at which the data is to be written, from the video/sound recording section 22. The recording controller 116 controls the position of the recording head 112 based on the positional information and writes the data into the recording medium 110 via the recording head 112.

The reproducing controller 118 receives information, e.g., an address on the recording medium 110, indicating a position of the recording medium 110 from which the data is to be read out, from the video/sound reproducing section 40. The reproducing controller 118 controls the position of the reproducing head 114 based on the positional information and reads out the data corresponding to the positional information from the recording medium 110 via the reproducing head 114.

Thus, the recording controller 116 and the reproducing controller 118 can be controlled independent of each other. As a result, the recording head 112 and the reproducing head 114 can also be controlled independent of each other. Therefore, it becomes possible to perform the reproduction operation of the video and the sound recorded on the recording medium 110 in parallel with the recording operation of the video and the sound on the recording medium 110.

Figure 3:
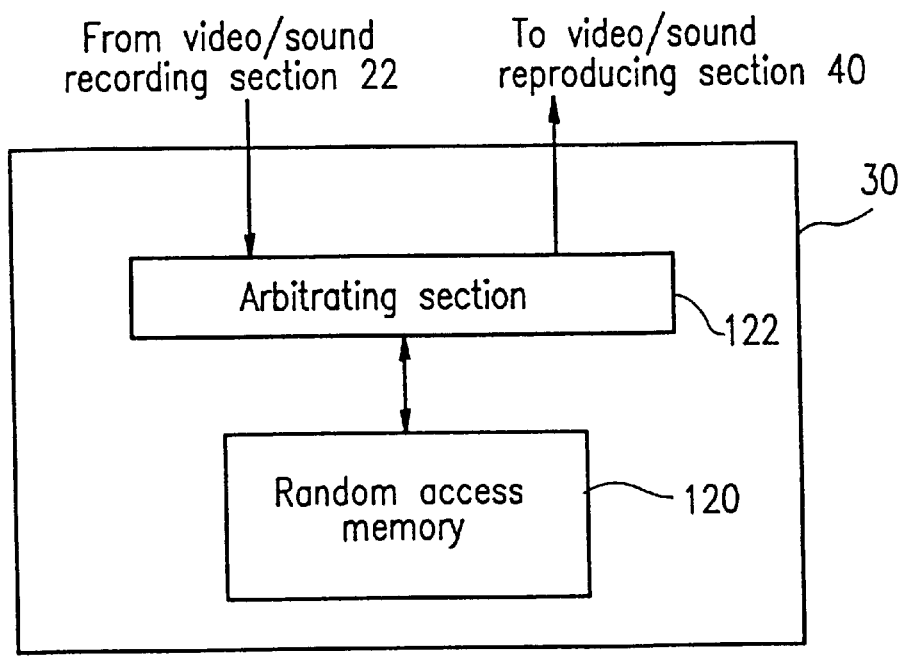
FIG. 3 is a diagram showing another specific configuration for the memory section 30 in the apparatus 100.

FIG. 3 shows another specific configuration for the memory section 30. The memory section 30 includes an arbitrating section 122 and a random access memory 120.

The arbitrating section 122 receives a write command from the video/sound recording section 22 and a read command from the video/sound reproducing section 40. The arbitrating section 122 arbitrates between the write command and the read command, thereby sequentially outputting the write command and the read command to the random access memory 120. As a result, a simultaneous access to the random access memory 120 is prevented. By setting the cycle of the write command and the read command to be given to the random access memory 120 to be sufficiently small, it is possible to consider that the operation of writing the data onto the random access memory 120 can be performed substantially in parallel with the operation of reading out the data from the random access memory 120. Therefore, under such a configuration, it is also possible to perform the operation of reproducing the video and the sound recorded in the memory section 30 in parallel with the operation of recording the video and the sound in the memory section 30.

Referring back to FIG. 1, the video/sound reproducing section 40 reproduces the video and the sound supplied from the memory section 30. A reproduction start signal, a reproduction end signal, a time-shift reproduction start signal and a time-shift reproduction end signal are input from the input section 14 to the video/sound reproducing section 40 via a line 103.

The video/sound reproducing section 40 starts and ends a normal reproduction operation in response to the reproduction start signal and the reproduction end signal, respectively. In response to the time-shift reproduction start signal, the video/sound reproducing section 40 receives positional information on the video and the sound recorded in the memory section 30 from the memory region management section 31 and then starts to reproduce the video and the sound based on the positional information. In response to the time-shift reproduction end signal, the video/sound reproducing section 40 ends the reproduction operation.

The memory region management section 31 manages the memory region of the video and the sound recorded in the memory section 30, and determines a memory region where a video and a sound is newly recorded. More specifically, the memory region management section 31 has a region R for storing therein the information, e.g., an address on the recording medium, indicating a position in the memory section 30 at which the video and the sound are recorded.

When the recording start signal is input to the video/sound recording section 22, the video/sound recording section 22 starts the recording operation. The video/sound recording section 22 inquires of the memory region management section 31 where the video and the sound supplied from the broadcast receiving section 10 are to be recorded in the memory section 30, and obtains information indicating a position at which the video and the sound are to be recorded as a reply to the inquiry. The memory region management section 31 determines a position at which the video and the sound are to be recorded, and stores information indicating the position in the region R.

In the situation where the recording start signal is input to the video/sound recording section 22 again after the recording operation is once ended, new positional information is overwritten in the region R in the memory region management section 31. Thus, the memory region management section 31 holds only the latest positional information.

When the time-shift reproduction start signal is input to the video/sound reproducing section 40, the video/sound reproducing section 40 reads out positional information by reference to the region R in the memory region management section 31, thereby starting to reproduce the video and the sound from the position indicated by the positional information.

The selective output section 50 selectively outputs at least one of the video and the sound output from the broadcast receiving section 10 and the video and the sound output from the video/sound reproducing section 40. The selective output section 50 may selectively output either one of the output from the broadcast receiving section 10 and the output from the video/sound reproducing section 40, or may output both the output from the broadcast receiving section 10 and the output from the video/sound reproducing section 40 by applying priority orders to the two outputs.

The priority order is used to determine a mode for displaying a video in a video display section 60 or a mode for outputting a sound in a sound output section 70. For example, it is assumed that the selective output section 50 applies a priority order "1" to the output from the broadcast receiving section 10 and a priority order "2" to the output from the video/sound reproducing section 40. In this case, the video display section 60 displays the video output from the broadcast receiving section 10 on a main screen and the video output from the video/sound reproducing section 40 on a sub-screen, for example. In a similar manner, the video display section 60 can employ an arbitrary display mode in accordance with the priority order. The sound output section 70 outputs the sound output from the broadcast receiving section 10 at a higher loudness level and the sound output from the video/sound reproducing section 40 at a lower loudness level, for example. In a similar manner, the sound output section 70 can employ an arbitrary output mode in accordance with the priority order.

The selection in the selective output section 50 is made in response to a video/sound selection signal input from the input section 14 via a line 104. The video/sound selection signal is used by a user for manually switching the output from the broadcast receiving section 10 and the output from the video/sound reproducing section 40. The selection in the selective output section 50 is also made in response to the time-shift reproduction start signal and the time-shift reproduction end signal input from the input section 14 via the line 104.

Next, referring to FIGS. 4A to 4D, the operation of the apparatus 100 will be described in association with the "time-shift reproduction" function.

FIGS. 4A to 4D show a temporal relationship among the output from the broadcast receiving section 10 (input data); the input to the memory section 30 (recording data); the output from the memory section 30 (reproduced data); and the output from the selective output section 50 (output data).

In FIGS. 4A to 4D, each of the numbered squares indicates one unit for recording and reproduction. For example, this square may represent one frame or one field. In addition, this square may represent analog data or digital data.

Figure 4:
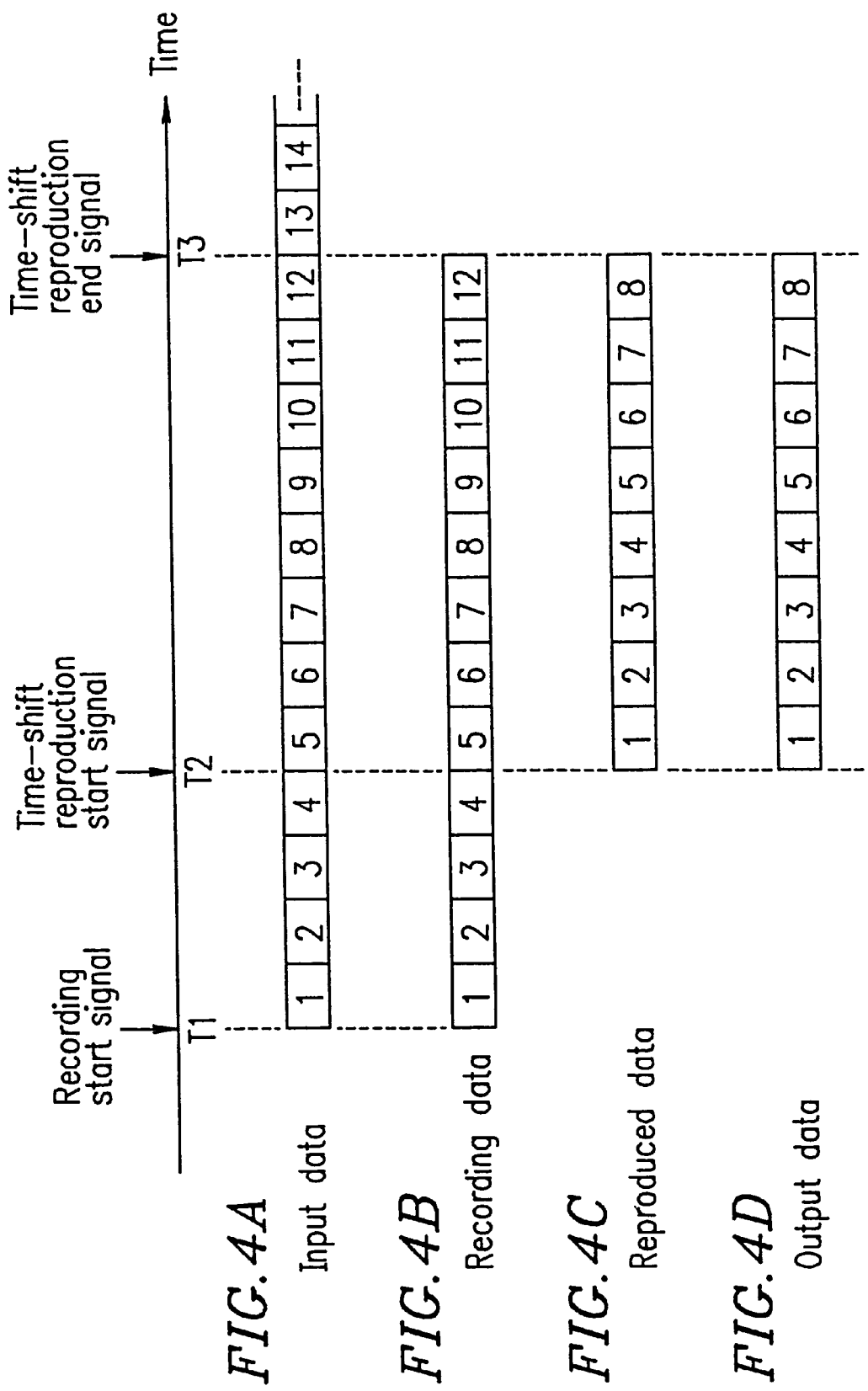
FIGS. 4A to 4D are time charts showing an operation of the apparatus 100 in association with the "time-shift reproduction" function.
Figure 5:
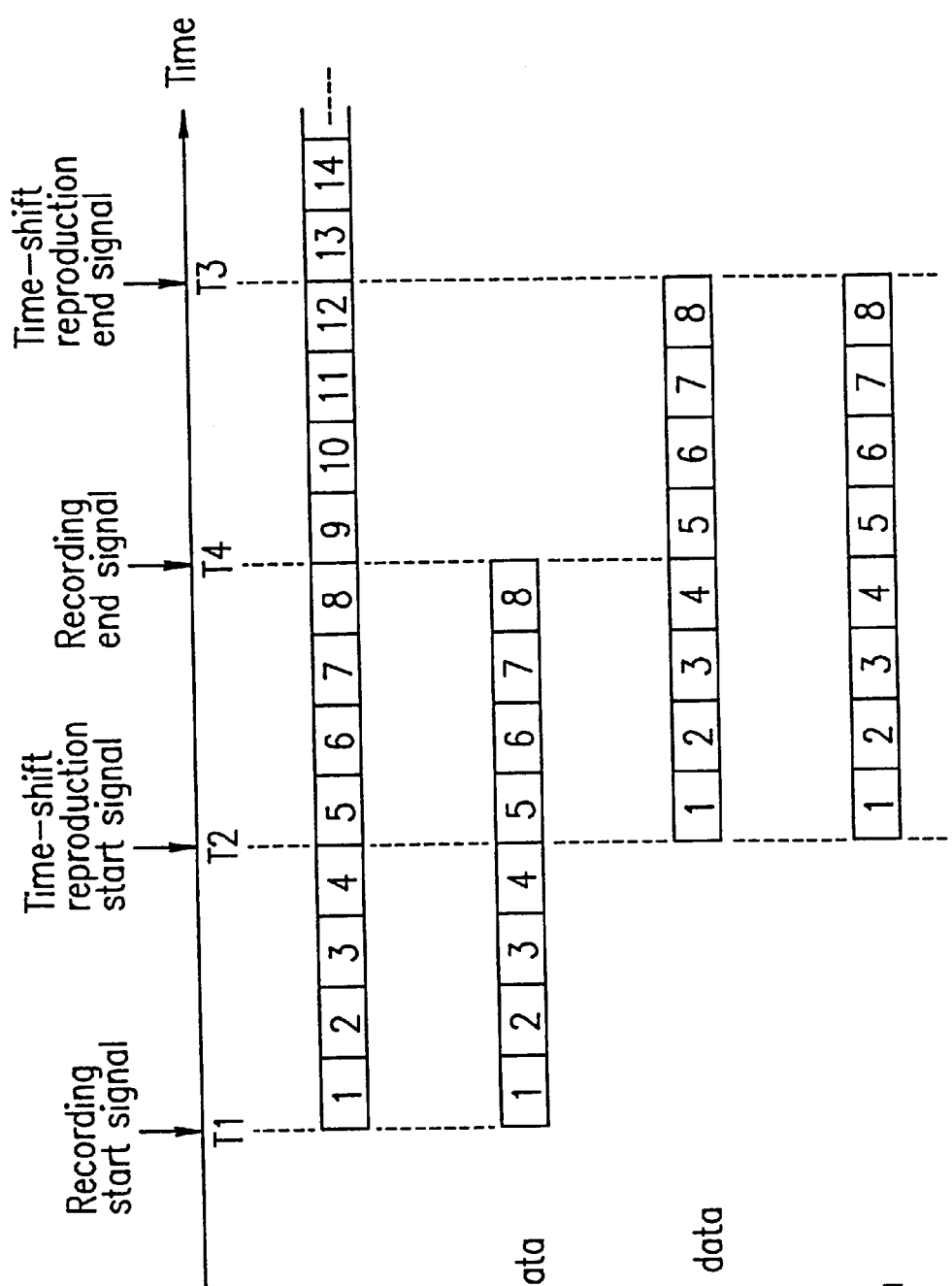
FIGS. 5A to 5D are time charts showing another operation of the apparatus 100 in association with the "time-shift reproduction" function.

When a recording start signal is input from the input section 14 at a time T1, the recording start signal is supplied to the video/sound recording section 22 via a line 102. As a result, the video/sound recording section 22 starts the recording operation. Consequently, the input data (data 1, 2, 3, 4, . . . ) are sequentially recorded in the memory section 30 (FIGS. 4A and 4B).

When a time-shift reproduction start signal is input from the input section 14 at a time T2, the time-shift reproduction start signal is supplied to the video/sound reproducing section 40 via a line 103 and to the selective output section 50 via a line 104. As a result, the video/sound reproducing section 40 starts the reproduction operation from the head of the recorded data. Consequently, the recorded data (data 1, 2, 3, 4, . . . ) are sequentially reproduced as reproduced data from the time T2 (FIG. 4C). In addition, the selective output section 50 automatically changes the output thereof so that at least the reproduced data is selectively output. As a result, at least the reproduced data is output from the selective output section 50 as the output data (FIG. 4D).

When a time-shift reproduction end signal is input from the input section 14 at a time T3, the time-shift reproduction end signal is supplied to the video/sound recording section 22 via the line 102, to the video/sound reproducing section 40 via the line 103, and to the selective output section 50 via the line 104. As a result, the video/sound recording section 22 ends the recording operation; the video/sound reproducing section 40 ends the reproduction operation; and the selective output section 50 automatically changes the output thereof so that at least the output immediately before the time-shift reproduction start signal is input is selectively output.

Thus, the reproduction operation of the video and the sound recorded in the memory section 30 can be performed in parallel with the recording operation of the video and the sound in the memory section 30 from the time T2 to the time T3.

In the operation exemplified in FIGS. 4A to 4D, the data 9 to 12 are recorded in the memory section 30. However, the data 9 to 12 are not reproduced by the video/sound reproducing section 40. Accordingly, as shown in FIGS. 5A to 5D, even if the video/sound recording section 22 is made to end the recording operation at a time T4 by inputting the recording end signal from the input section 14 at the time T4, the same operation as that shown in FIGS. 4A to 4D can be performed.

Thus, by inputting the recording end signal at the time T4, it is possible to prevent redundant data from being recorded in the memory section 30. For example, in the case where the length of a program to be recorded is known beforehand, it is possible to input such a recording end signal in good time.

It is noted that the recording start signal and the recording end signal may be manually input by a user, or may be automatically input at a preset time by utilizing a known function of absence recording.

In the first example described above, a timeshift reproduction start signal and a time-shift reproduction end signal are provided separately from a reproduction start signal and a reproduction end signal which have conventionally been used. A method for realizing the generation of such signals most easily, is a method in which the input section 14 generates the reproduction start signal and the reproduction end signal in the case where the user inputs a reproduction start command and a reproduction end command to the input section 14, respectively, and the input section 14 generates the time-shift reproduction start signal and the time-shift reproduction end signal in the case where the user inputs a time-shift reproduction start command and a time-shift reproduction end command to the input section 14, respectively. However, it may be too complex for the user to distinguish the reproduction start command from the time-shift reproduction start command and distinguish the reproduction end command from the time-shift reproduction end command, and to input these commands to the input section 14.

By additionally providing a state judging section 15 (not shown) for judging whether or not the apparatus 100 is in the recording state, it becomes possible to eliminate the necessity of distinction between the reproduction start command and the time-shift reproduction start command and the distinction between the reproduction end command and the time-shift reproduction end command.

The state judging section 15 judges whether or not the apparatus 100 is in the recording state. Such a judgement is accomplished, for example, by monitoring the recording start signal and the recording end signal input from the input section 14 to the video/sound recording section 22. When the reproduction start command is input by the user to the input section 14, the input section 14 inquires whether or not the apparatus 100 is in the recording state of the state judging section 15. In response to the inquiry, the state judging section 15 answers a judgement result to the input section 14. In the case where the judgement result indicates that the apparatus 100 is not in the recording state, the input section 14 generates a reproduction start signal. The reproduction start signal is supplied to the video/sound reproducing section 40. On the other hand, in the case where the judgement result indicates that the apparatus 100 is in the recording state, the input section 14 generates a time-shift reproduction start signal. The time-shift reproduction start signal is supplied to the video/sound reproducing section 40 and the selective output section 50.

Also, the state judging section 15 judges which of the reproduction start signal and the time-shift reproduction start signal was generated more recently. Such a judgement is accomplished, for example, by monitoring the reproduction start signal and the time-shift reproduction start signal generated by the input section 14. When a reproduction end command is input by the user to the input section 14, the input section 14 inquires which of the reproduction start signal and the time-shift reproduction start signal was generated more recently of the state judging section 15. In response to the inquiry, the state judging section 15 answers a judgement result to the input section 14. In the case where the judgement result indicates that it was the reproduction start signal, the input section 14 generates a reproduction end signal. The reproduction end signal is supplied to the video/sound reproducing section 40. On the other hand, in the case where the judgement result indicates that it was the time-shift reproduction signal, the input section 14 generates a time-shift reproduction end signal. The time-shift reproduction end signal is supplied to the video/sound recording section 22, the video/sound reproducing section 40 and the selective output section 50.

In this way, the same operation as those shown in FIGS. 4A to 4D and FIGS. 5A to 5D can be performed without using the time-shift reproduction start command and the time-shift reproduction end command. The state judging section 15 may be incorporated in the input section 14.

EXAMPLE 2

Figure 6:
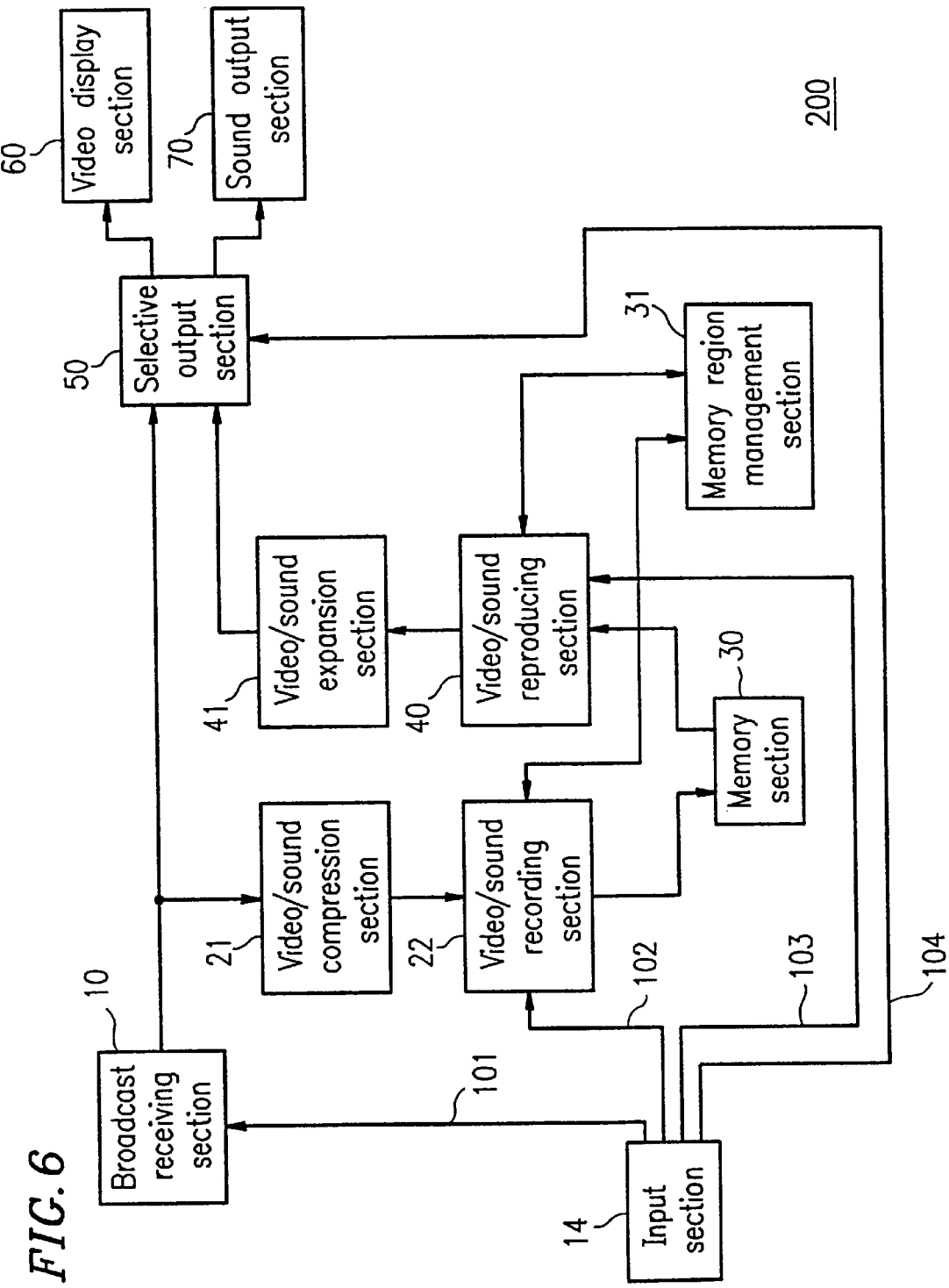
FIG. 6 is a block diagram showing a configuration for an apparatus 200 for recording and reproducing video and sound according to a second example of the present invention.

FIG. 6 shows a configuration for an apparatus 200 for recording and reproducing video and sound according to a second example of the present invention. The configuration of the apparatus 200 is the same as that of the apparatus 100 shown in FIG. 1 except that a video/sound compression section 21 and a video/sound expansion section 41 are additionally provided for the apparatus 200. Therefore, the same components will be identified by the same reference numerals and the description thereof will be omitted herein.

The video/sound compression section 21 compresses the video and the sound output from the broadcast receiving section 10 by a predetermined method. The video/sound expansion section 41 expands the video and the sound output from the video/sound reproducing section 40 by a predetermined method. An arbitrary method can be employed as the compression method or as the expansion method. For example, a compression method or an expansion method in compliance with a standard MPEG1 or MPEG2 can be employed.

In the second example, not only the effects of the first example can be attained but also the amount of data to be recorded in the memory section 30 can be reduced by compressing the output from the broadcast receiving section 10. As a result, it is possible to use a less expensive memory device having a lower data transmission rate and a smaller memory capacity than that of the first example as the memory section 30. In the case of using the same memory section 30 as that of the first example in this second example, it is possible to considerably increase the recordable time of the memory section 30.

EXAMPLE 3

Figure 7:
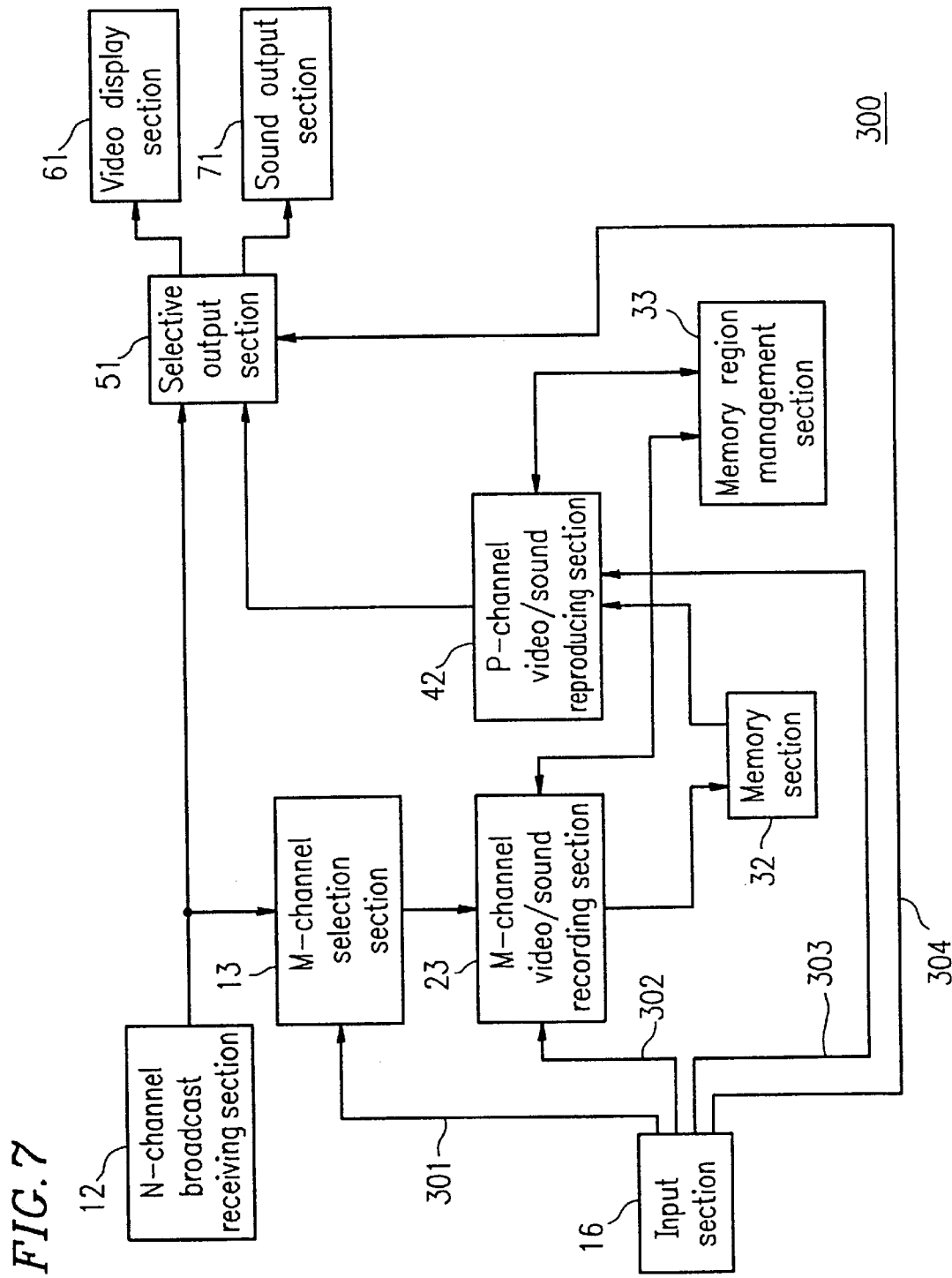
FIG. 7 is a block diagram showing a configuration for an apparatus 300 for recording and reproducing video and sound according to a third example of the present invention.

FIG. 7 shows a configuration for an apparatus 300 for recording and reproducing video and sound according to a third example of the present invention. The apparatus 300 has a "time-shift reproduction" function corresponding to multiple channels. The "time-shift reproduction" function corresponding to multiple channels is herein defined as a function of, during recording of programs of a plurality of channels which are now being broadcasted, reproducing a plurality of recorded programs from the beginning while continuing recording the plurality of programs.

Hereinafter, the respective components of the apparatus 300 will be described with reference to FIG. 7.

An N-channel broadcast receiving section 12 receives video and sound of a N number of channels now being broadcasted, where N is a positive integer.

An M-channel selection section 13 selects a M number of channels from the N number of channels in response to a channel selection signal supplied from an input section 16, thereby outputting the video and the sound corresponding to the selected M number of channels to an M-channel video/sound recording section 23. The channel selection signal is input from the input section 16 to the M-channel selection section 13 via a line 301, where M is a positive integer and $N \geq M$.

The M-channel video/sound recording section 23 inquires of a memory region management section 33 where the video and the sound corresponding to the M number of channels selected by the M-channel selection section 13 are to be recorded in a memory section 32, and obtains information indicating a position at which the video and the sound are to be recorded as a reply to the inquiry. The M-channel video/sound recording section 23 records the video and the sound at the position indicated by the information in the memory section 32. This positional information is determined by the memory region management section 33, and is referred to when a time-shift reproduction is made by a P-channel video/sound reproducing section 42 as will be described later. This positional information is, for example, an address on a recording medium.

A recording start signal, a recording end signal and a time-shift reproduction end signal are input from the input section 16 to the M-channel video/sound recording section 23 via a line 302. The M-channel video/sound recording section 23 starts a recording operation in response to the recording start signal, and ends the recording operation in response to the recording end signal or the time-shift reproduction end signal.

The memory section 32 has a function of performing the reproduction operation of the video and the sound recorded in the memory section 32 in parallel with performing the recording operation of video and sound in the memory section 32. For example, the memory section 32 may be an optical disk driving apparatus having a M number of recording heads and a P number of reproducing heads which can be driven independently from each other, or a hard disk driving apparatus including a plurality of such heads. Alternatively, the memory section 32 may be a random accessible semiconductor memory. The memory section 32 can be configured in the same way as the memory section 30 described with reference to FIGS. 2 and 3.

The P-channel video/sound reproducing section 42 selects a P number of channels among a plurality of channels recorded in the memory section 32 in response to the channel selection signal supplied from the input section 16, thereby reproducing the video and the sound corresponding to the selected P number of channels. The P number of channels may be selected among the M number of channels which are being recorded in the memory section 32 and/or a plurality of channels which were previously recorded in the memory section 32. The channel selection signal is input from the input section 16 to the P-channel video/sound reproducing section 42 via a line 303, where P is a positive integer.

A reproduction start signal, a reproduction end signal, a time-shift reproduction start signal and a time-shift reproduction end signal are input from the input section 16 to the P-channel video/sound reproducing section 42 via a line 303.

The P-channel video/sound reproducing section 42 starts and ends a reproduction operation of the P number of channels in response to the reproduction start signal and the reproduction end signal, respectively. In response to the time-shift reproduction start signal, the P-channel video/sound reproducing section 42 receives positional information on the video and the sound recorded in the memory section 32 from the memory region management section 33 and then starts to reproduce the video and the sound of the number P of channels based on the positional information. In response to the timeshift reproduction end signal, the P-channel video/sound reproducing section 42 ends the reproduction operation of the P number of channels.

The memory region management section 33 manages the memory regions of the video and the sound corresponding to a plurality of channels recorded in the memory section 32, and determines a memory region where a video and a sound are newly recorded. More specifically, the memory region management section 33 has a plurality of regions $R_1$ to $R_{M+K}$ for storing therein the information, e.g., an address on the recording medium, indicating the position in the memory section 32 at which the video and the sound corresponding to a plurality of channels are recorded.

When the recording start signal is input to the M-channel video/sound recording section 23, the M-channel video/ sound recording section 23 starts the recording operation of the M number of channels. The M-channel video/sound recording section 23 inquires of the memory region management section 33 where the video and the sound supplied from the M-channel selection section 13 are to be recorded in the memory section 32, and obtain information indicating positions at which the video and the sound are to be recorded as a reply to the inquiry. The memory region management section 33 determines positions at which the video and the sound are to be recorded, and stores information indicating the positions in the regions $R_1$ to $R_{M+K}$.

In the case where the recording start signal is input to the M-channel video/sound recording section 23 again after the recording operation was once ended, new positional information is overwritten in the regions $R_1$ to $R_{M+K}$ in the memory region management section 33. In this way, the memory region management section 33 holds only the latest positional information.

When the time-shift reproduction start signal is input to the P-channel video/sound reproducing section 42, the P-channel video/sound reproducing section 42 reads out the positional information by reference to a P number of regions of the regions $R_1$ to $R_{M+K}$ in the memory region management section 33, thereby starting to reproduce the video and the sound corresponding to the P number of channels from the position indicated by the positional information.

The selective output section 51 selectively outputs at least the video corresponding to a Q number of channels and the sound corresponding to one channel among the video and the sound corresponding to the N number of channels output from the N-channel broadcast receiving section 12 and the video and the sound corresponding to the P number of channels output from the P-channel video/sound reproducing section 42, where Q is a positive integer and N+P≧Q. Alternatively, the selective output section 51 can selectively output only the video corresponding to the number Q of channels and the sound corresponding to one channel among the output from the N-channel broadcast receiving section 12 and the output from the P-channel video/sound reproducing section 42, or may output both the output from the N-channel broadcast receiving section 12 and the output from the P-channel video/sound reproducing section 42 by applying priority orders to the respective outputs.

The priority orders are used to determine a mode for displaying a video in a video display section 61 or a mode for outputting a sound in a sound output section 71. For example, it is assumed that the selective output section 51 applies priority orders "$P_1$ to $P_N$" to the outputs from the N-channel broadcast receiving section 12 and priority orders "$P_{N+1}$ to $P_{N+P}$" to the outputs from the P-channel video/sound reproducing section 42. In this case, the video display section 61 displays a video having a priority order "$P_i$" on a screen having an area proportional to the priority order "$P_i$". In the same way, the video display section 61 can employ an arbitrary display mode in accordance with the priority orders. The sound output section 71 outputs a sound having a priority order "$P_i$" at a loudness level proportional to the priority order "$P_i$". Herein, i=1, 2, 3 . . . , N+P. In a similar manner, the sound output section 71 can employ an arbitrary output mode in accordance with the priority orders. However, it is preferable for the sound output section 71 to set the loudness level of the sounds other than one selected sound to be zero in order to prevent the confusion of a plurality of sounds.

The selection in the selective output section 51 is made in response to a video/sound selection signal input from the input section 16 via a line 304. The video/sound selection signal is used by a user for manually switching the output from the N-channel broadcast receiving section 12 and the output from the P-channel video/sound reproducing section 42. The selection in the selective output section 51 is also made in response to the time-shift reproduction start signal and the time-shift reproduction end signal input from the input section 16 via the line 304.

EXAMPLE 4

Figure 8:
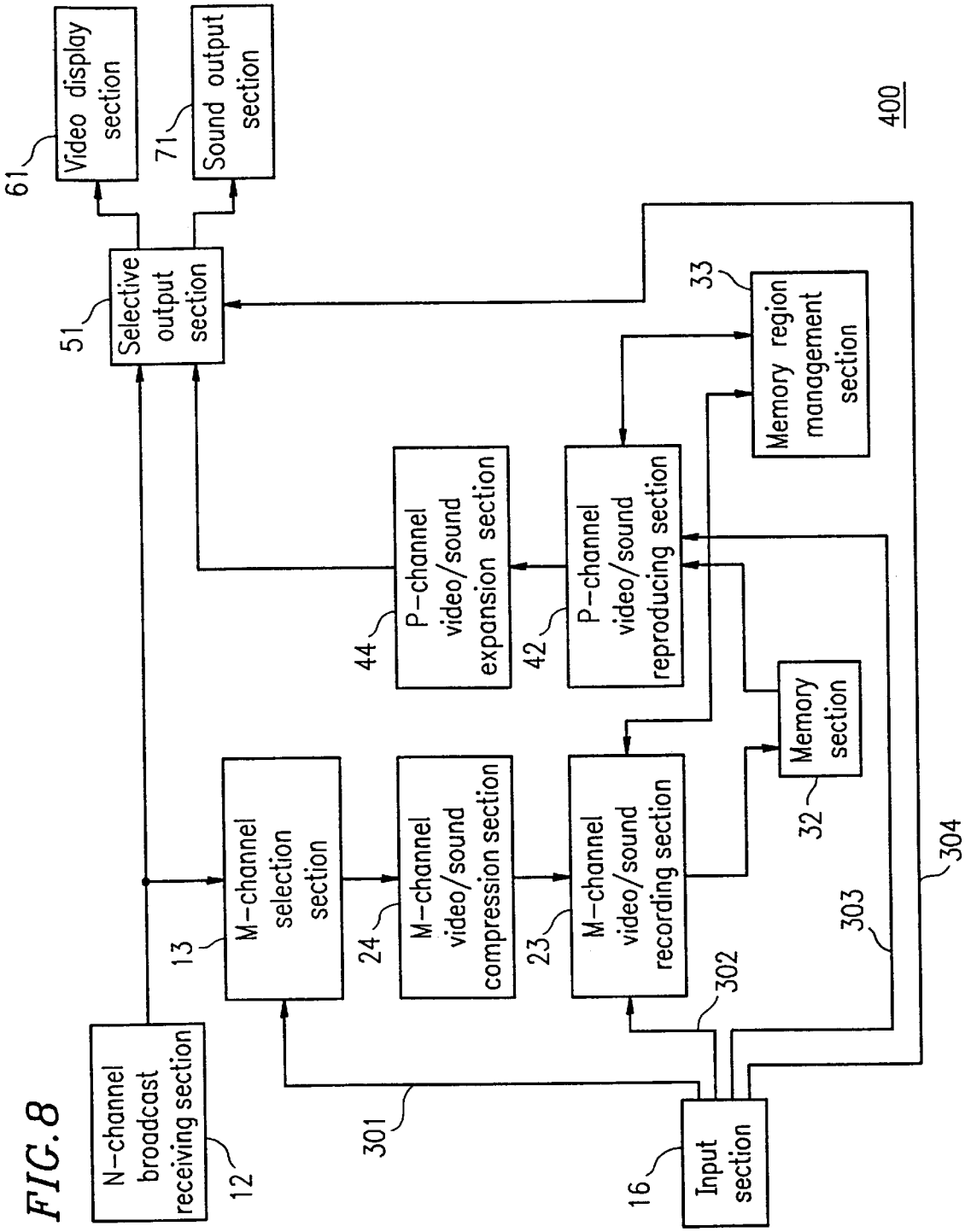
FIG. 8 is a block diagram showing a configuration for an apparatus 400 for recording and reproducing video and sound according to a fourth example of the present invention.

FIG. 8 shows a configuration for an apparatus 400 for recording and reproducing video and sound according to a fourth example of the present invention. The configuration of the apparatus 400 is the same as that of the apparatus 300 shown in FIG. 7 except that an M-channel video/sound compression section 24 and a P-channel video/sound expansion section 44 are additionally provided for the apparatus 400. Therefore, the same components will be identified by the same reference numerals and the description thereof will be omitted herein.

The M-channel video/sound compression section 24 compresses the video and the sound of a M number of channels output from the M-channel selection section 13 by a predetermined method. The P-channel video/sound expansion section 44 expands the video and the sound of a P number of channels output from the P-channel video/sound reproducing section 42 by a predetermined method. An arbitrary method can be employed as the compression method or as the expansion method. For example, a compression method or an expansion method in compliance with a standard MPEG1 or MPEG2 can be employed.

In the fourth example, not only the effects of the third example can be attained but also the amount of data to be recorded in the memory section 32 can be reduced by compressing the output from the M-channel selection section 13. As a result, it is possible to use a less expensive memory device having a lower data transmission rate and a smaller memory capacity than that of the third example as the memory section 32. In the case of using the same memory section 32 as that of the third example in this fourth example, it is possible to considerably increase the recordable time of the memory section 32.

EXAMPLE 5

Figure 9:
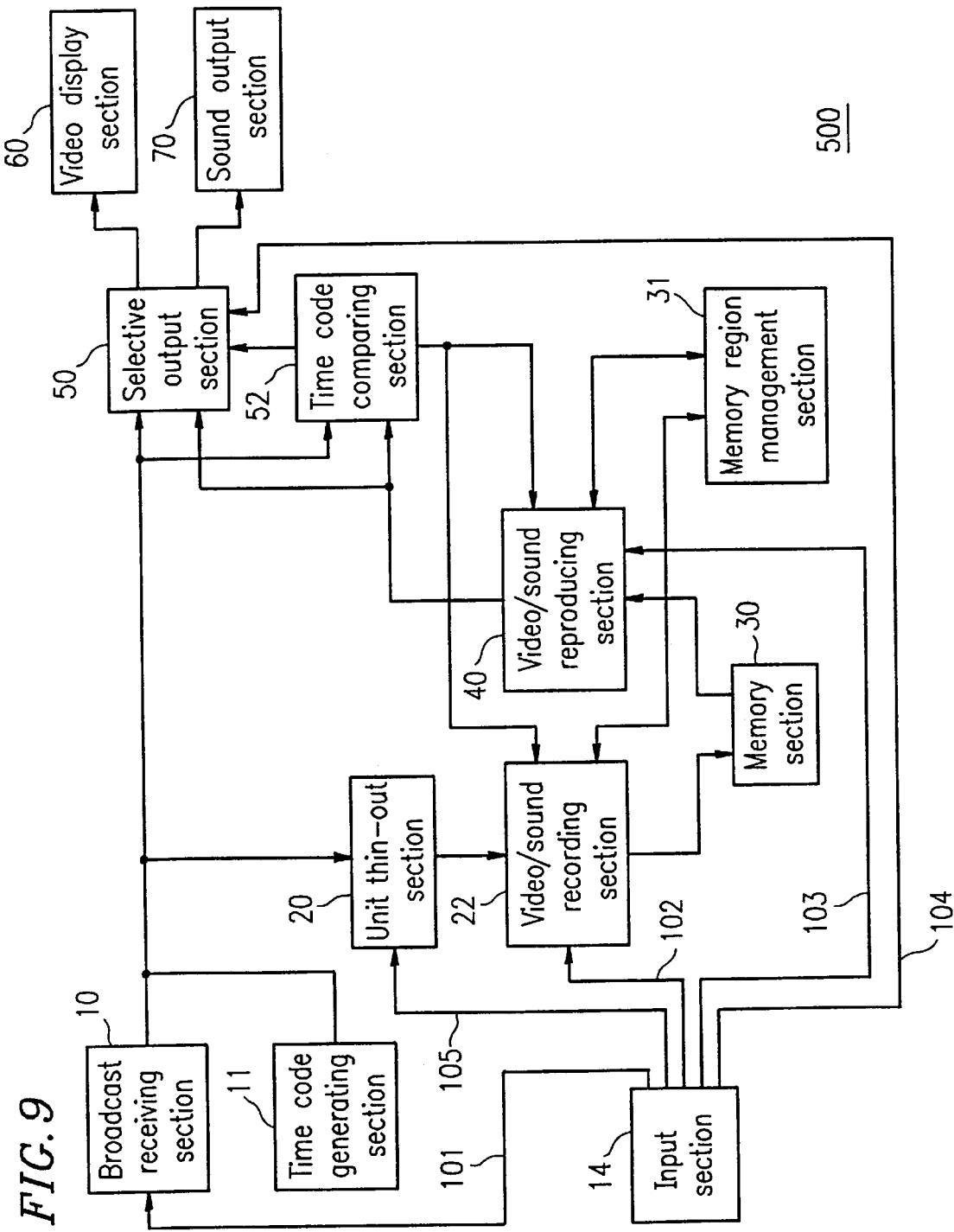
FIG. 9 is a block diagram showing a configuration for an apparatus 500 for recording and reproducing video and sound according to a fifth example of the present invention.

FIG. 9 shows a configuration for an apparatus 500 for recording and reproducing video and sound according to a fifth example of the present invention.

The apparatus 500 has a "time-shift fast-forward reproduction" function. The "time-shift fast-forward reproduction" function is herein defined as a function of starting to record a program now being broadcasted at a point where watching and listening of the program was suspended; fast-forward reproducing later the video and the sound which have been recorded from the point where watching and listening of the program was suspended; automatically stopping the fast-forward reproduction at a point where the video and the sound fast-forward reproduced catch up with the video and the sound now being broadcasted; and then automatically switching the former into the latter.

The "time-shift fast-forward reproduction" function is effectively applicable, for example, to a case where watching and listening of a program now being broadcasted must be suspended and a user later wants to restart to watch and listen to the program from the point where watching and listening of the program was suspended.

The configuration of the apparatus 500 is the same as that of the apparatus 100 shown in FIG. 1 except that a time code generating section 11, a unit thin-out section 20 and a time code comparing section 52 are additionally provided for the apparatus 500. Therefore, the same components will be identified by the same reference numerals and the description thereof will be omitted herein.

The time code generating section 11 generates a time code and then applies the time code to one unit of the video and the sound output from the broadcast receiving section 10. When the video and the sound are digital data, the application of the time code is accomplished by adding a plurality of bits representing the time code to the digital data. When the video and the sound are analog data, the application of the time code is accomplished by inserting an analog signal representing the time code during an inter-frame vertical retrace line period, for example. The "time code" herein refers to information for identifying a time. The "one unit" of the video and the sound herein refers to one unit for recording and reproduction. For example, one unit for recording and reproduction may be either one frame or one field. Note that, in this example, an expression "video and sound" means video and sound with a time code applied but for some special limitation.

The unit thin-out section 20 thins out (or decimates) video and sound with a time code applied at a predetermined ratio. The predetermined ratio is input from the input section 14 to the unit thin-out section 20 via a line 105. For example, in the case where the predetermined ratio is 50%, the unit thin-out section 20 thins out one of two units of the video and the sound output from the broadcast receiving section 10. Such a thin-out unit may be either one frame or one field. In this way, the video and the sound thinned out by the unit thin-out section 20 are supplied to the video/sound recording section 22. As a result, the video/sound recording section 22 records the thinned out video and sound in the memory section 30.

The video/sound reproducing section 40 reproduces the video and the sound recorded in the memory section 30. As described above, the video and the sound recorded in the memory section 30 have been thinned out by the unit thin-out section 20. The video/sound reproducing section 40 performs a signal processing for the thinned out sound so that the thinned out sound is recognizable as a normal sound by a human being. Any known processing can be employed as the signal processing, e.g., shortening a shadow zone, smoothly connecting the reproduced sounds, or the like.

A time code comparing section 52 compares a time code TC1 of the video and the sound output from the broadcast receiving section 10 with the time code TC2 of the video and the sound output from the video/sound reproducing section 40. In the case where the time indicated by the time code TC2 is equal to or later than the time indicated by the time code TC1, the time code comparing section 52 stops the reproduction operation of the video/sound reproducing section 40 and the recording operation of the video/sound recording section 22, and changes the selection in the selective output section 50.

The selective output section 50 selectively outputs at least one of the video and the sound output from the broadcast receiving section 10 and the video and the sound output from the video/sound reproducing section 40. The selection in the selective output section 50 is made in response to a video/sound selection signal input from the time code comparing section 52. In the case where the video and the sound which have been fast-forward reproduced have caught up with the video and the sound now being broadcasted, the video/sound selection signal is used to switch the video and the sound output from the video/sound reproducing section 40 into the video and the sound output from the broadcast receiving section 10. The selection in the selective output section 50 is also made in response to a time-shift fastforward reproduction start signal input from the input section 14 via a line 104.

Next, referring to FIGS. 10A to 10D, the operation of the apparatus 500 will be described in association with the "time-shift fast-forward reproduction" function.

FIGS. 10A to 10D show a temporal relationship among the output from the broadcast receiving section 10 (input data); the input to the memory section 30 (recording data); the output from the memory section 30 (reproduced data); and the output from the selective output section 50 (output data).

In FIGS. 10A to 10D, each of the numbered squares indicates one unit for recording and reproduction. For example, this square may represent one frame or one field. In addition, this square may represent analog data or digital data. Above each numbered square, a time code which is added to the data indicated by the square is shown.

Figure 10:
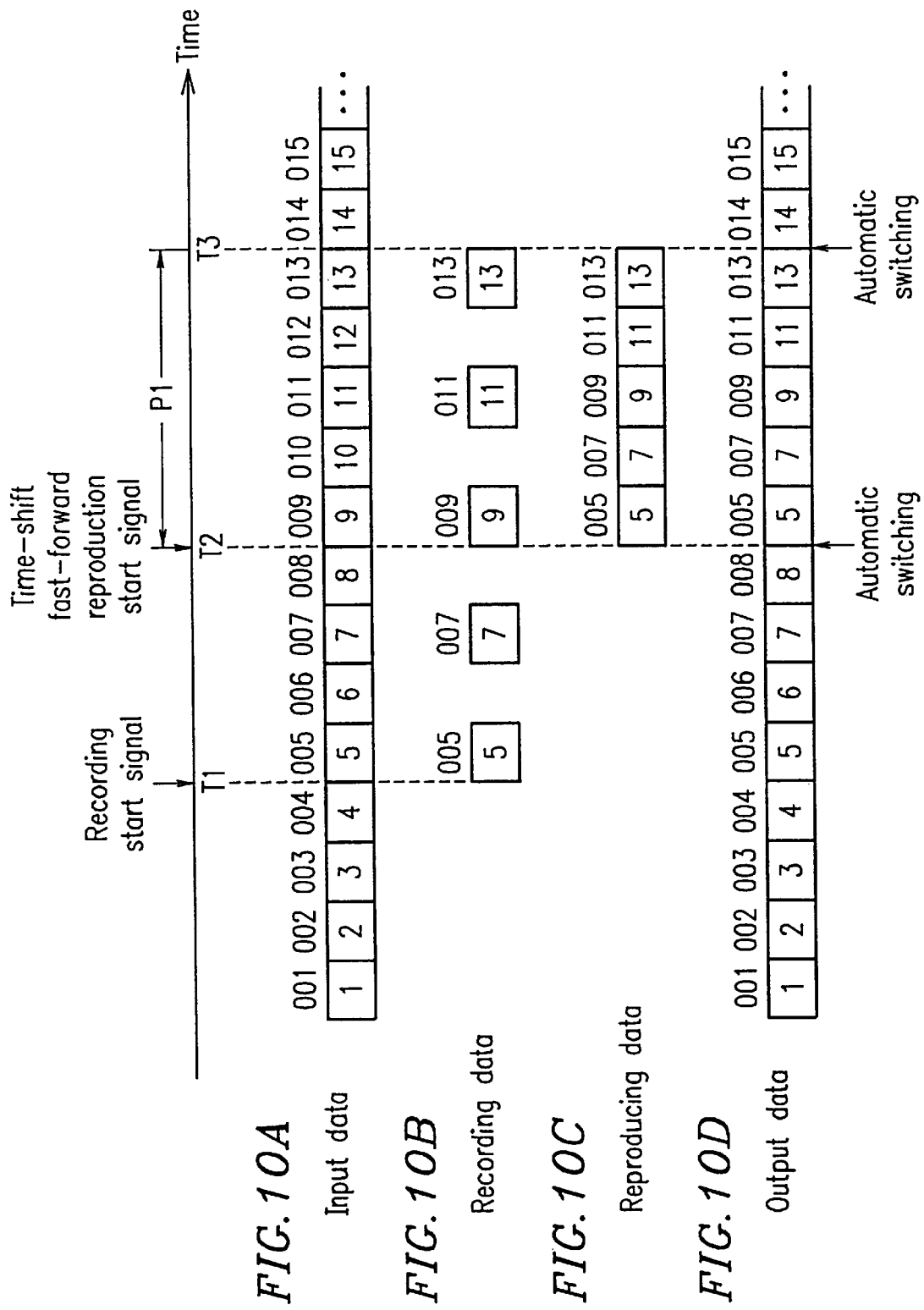
FIGS. 10A to 10D are time charts showing another operation of the apparatus 500 in association with the "time-shift fast-forward reproduction" function.

When a recording start signal is input from the input section 14 at a time T1, the recording start signal is supplied to the video/sound recording section 22 via a line 102. As a result, the video/sound recording section 22 starts the recording operation. Input data (data 5, 7, 9, 11, ...) thinned out by the unit thin-out section 20 are supplied to the video/sound recording section 22. Consequently, the input data thinned out by the unit thin-out section 20 are sequentially recorded in the memory section 30 (FIGS. 10A and 10B).

When a time-shift fast-forward reproduction start signal is input from the input section 14 at a time T2, the time-shift fast-forward reproduction start signal is supplied to the video/sound reproducing section 40 via a line 103 and to the selective output section 50 via a line 104. As a result, the video/sound reproducing section 40 starts the reproduction operation from the head of the recorded data. Consequently, the recorded data (data 5, 7, 9, 11, ...) are sequentially reproduced as reproduced data from the time T2 (FIG. 10C). In parallel with this reproduction operation, the video/sound recording section 22 continues the recording operation. In addition, in response to the time-shift fast-forward reproduction start signal, the selective output section 50 automatically switches the priority order corresponding to the input data into the priority order corresponding to the reproduced data so that the display of the reproduced data is given a priority. As a result, the reproduced data is output from the selective output section 50 as the output data in a higher priority than the input data (FIG. 10D).

During a period P1, the time indicated by the time code TC2 of the video and the sound output from the video/sound reproducing section 40 is earlier than the time indicated by the time code TC1 of the video and the sound output from the broadcast receiving section 10. As a result, the video/sound recording section 22 continues the recording operation and the video/sound reproducing section 40 continues the reproduction operation.

The video and the sound which have been fastforward reproduced catch up with the video and the sound now being broadcasted at a time T3. In the example shown in FIGS. 10B and 10C, the time (013) indicated by the time code TC1 accords with the time (013) indicated by the time code TC2 at the time T3. In such a case, the time code comparing section 52 supplies a recording end signal to the video/sound recording section 22, a reproduction end signal to the video/sound reproducing section 40 and a video/sound selection signal to the selective output section 50. As a result, the video/sound recording section 22 ends the recording operation in response to the recording end signal; the video/sound reproducing section 40 ends the reproduction operation in response to the reproduction end signal; and the selective output section 50 automatically switches the priority order corresponding to the reproduced data into the priority order corresponding to the input data in response to the video/sound selection signal so that the display of the input data is given a priority. As a result, the input data is output from the selective output section 50 as the output data in a higher priority than the reproduced data (FIG. 10D).

In this way, the reproduction operation of the video and the sound recorded in the memory section 30 can be performed in parallel with the recording operation of the video and the sound in the memory section 30 from the time T2 to the time T3.

EXAMPLE 6

Figure 11:
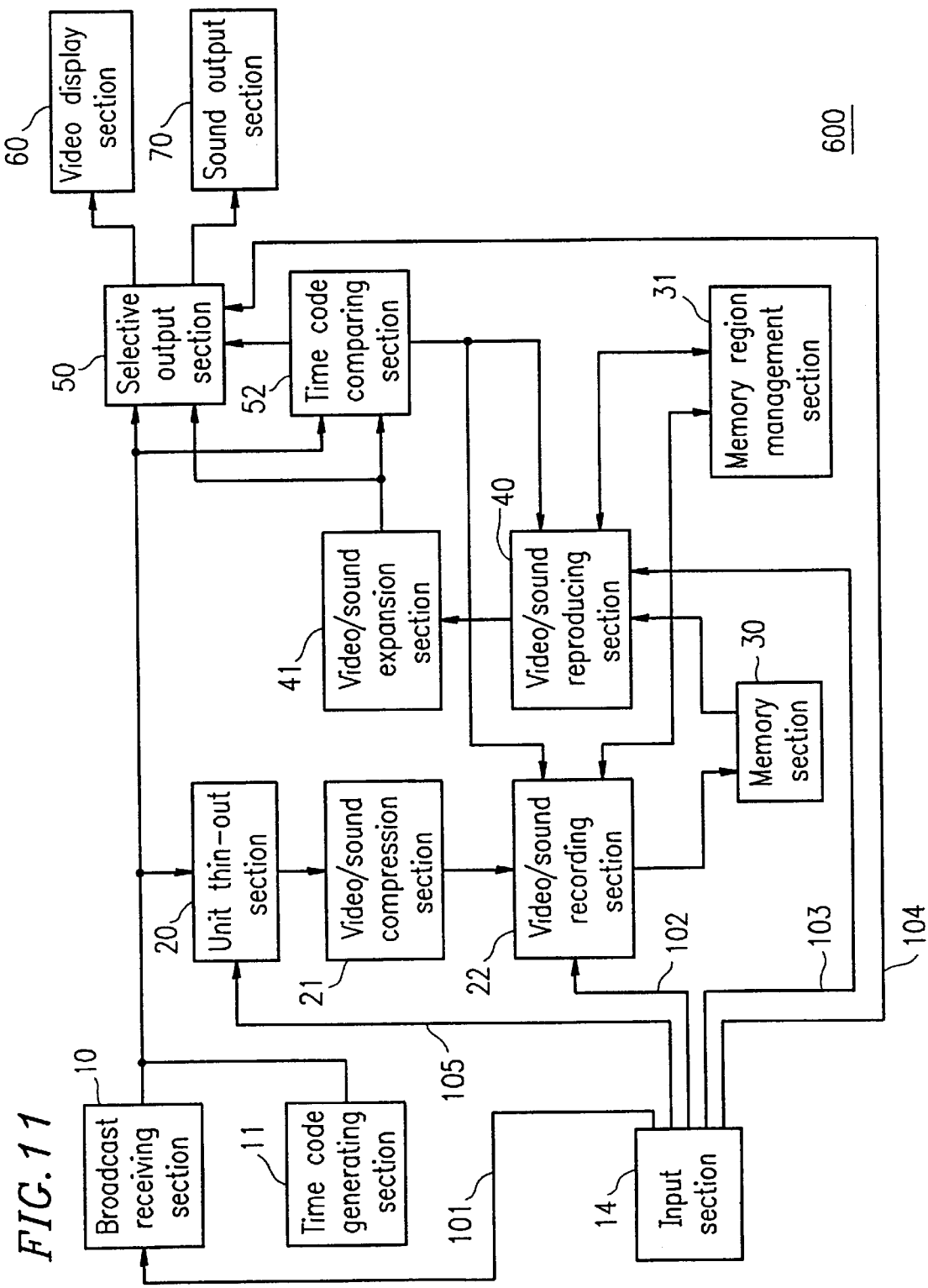
FIG. 11 is a block diagram showing a configuration for an apparatus 600 for recording and reproducing video and sound according to a sixth example of the present invention.

FIG. 11 shows a configuration for an apparatus 600 for recording and reproducing video and sound according to a sixth example of the present invention. The configuration of the apparatus 600 is the same as that of the apparatus 500 shown in FIG. 9 except that a video/sound compression section 21 and a video/sound expansion section 41 are additionally provided for the apparatus 600. Therefore, the same components will be identified by the same reference numerals and the description thereof will be omitted herein.

The video/sound compression section 21 compresses the video and the sound thinned out by the unit thin-out section 20 by a predetermined method. The video/sound expansion section 41 expands the video and the sound output from the video/sound reproducing section 40 by a predetermined method. An arbitrary method can be employed as the compression method or as the expansion method. For example, a compression method or an expansion method in compliance with a standard MPEG1 or MPEG2 can be employed.

In the sixth example, not only the effects of the fifth example can be attained but also the amount of data to be recorded in the memory section 30 can be reduced by compressing the output from the unit thin-out section 20. As a result, it is possible to use a less expensive memory device having a lower data transmission rate and a smaller memory capacity than that of the fifth example as the memory section 30. In the case of using the same memory section 30 as that of the fifth example in this sixth example, it is possible to considerably increase the recordable time of the memory section 30.

EXAMPLE 7

Figure 12:
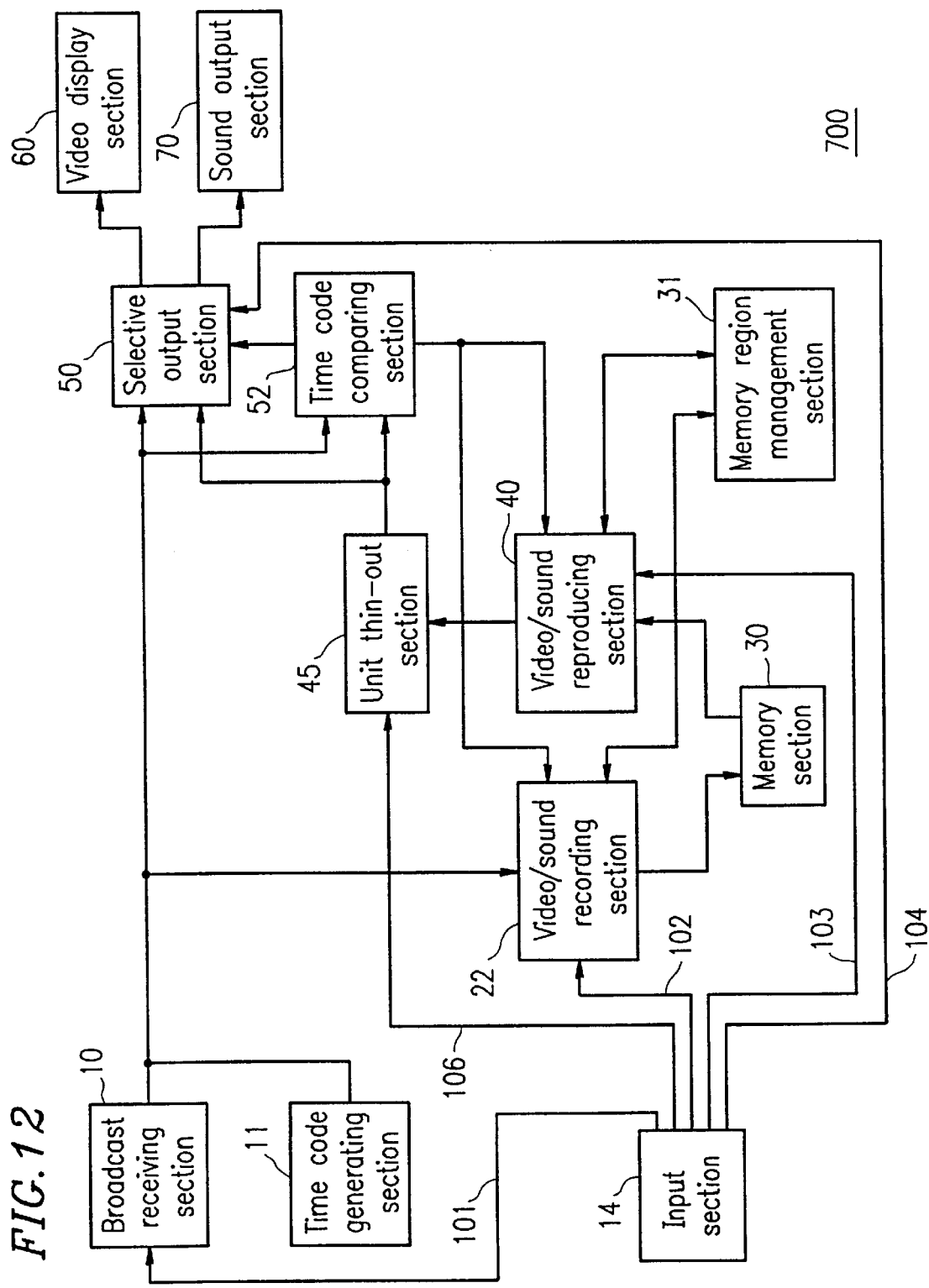
FIG. 12 is a block diagram showing a configuration for an apparatus 700 for recording and reproducing video and sound according to a seventh example of the present invention.

FIG. 12 shows a configuration for an apparatus 700 for recording and reproducing video and sound according to a seventh example of the present invention. The configuration of the apparatus 700 is the same as that of the apparatus 500 shown in FIG. 9 except that the unit thin-out section 20 prior to the video/sound recording section 22 is omitted but a unit thin-out section 45 is additionally provided posterior to the video/sound reproducing section 40 for the apparatus 700. Therefore, the same components will be identified by the same reference numerals and the description thereof will be omitted herein.

The apparatus 700 does not perform thin-out processing during the recording operation. As a result, the output from the broadcast receiving section 10 is recorded in the memory section 30 without being thinned out at all. On the other hand, the unit thin-out section 45 thins out the video and the sound reproduced by the video/sound reproducing section 40 at a predetermined ratio during the reproduction operation. The predetermined ratio is input from the input section 14 to the unit thin-out section 45 via a line 106. For example, in the case where the predetermined ratio is 50%, the unit thin-out section 45 thins out one of two units of the video and the sound output from the video/sound reproducing section 40. Such a thin-out unit may be either one frame or one field. In this way, the video and the sound thinned out by the unit thin-out section 45 are supplied to the time code comparing section 52.

In the seventh example, not only the effects of the fifth example can be attained, but also it is possible to freely set or change the reproduction speed by performing the thin-out processing for the video and the sound during the reproduction operation. As a result, a reproduction satisfying the users' needs can be performed easily.

EXAMPLE 8

Figure 13:
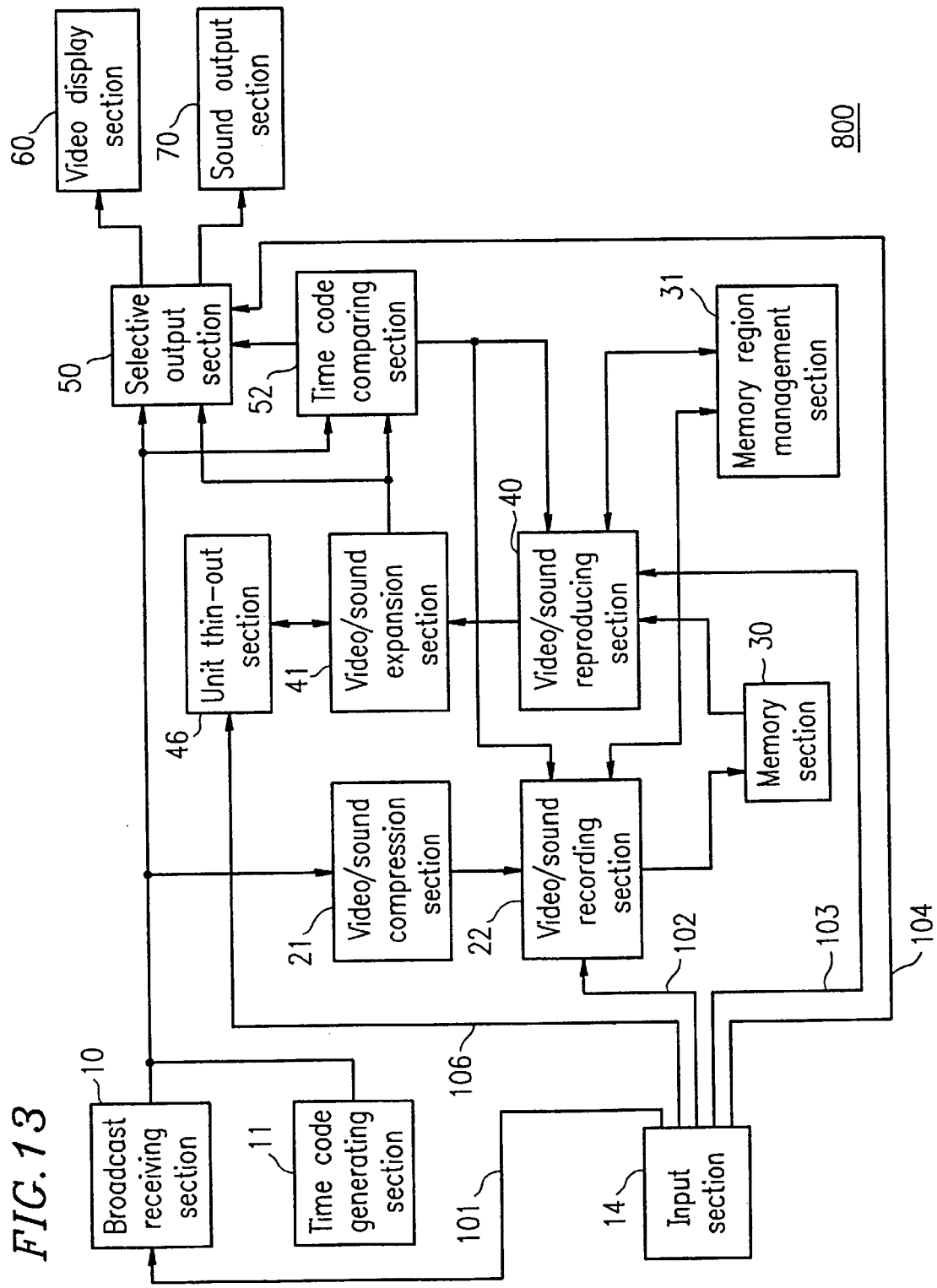
FIG. 13 is a block diagram showing a configuration for an apparatus 800 for recording and reproducing video and sound according to an eighth example of the present invention.

FIG. 13 shows a configuration for an apparatus 800 for recording and reproducing video and sound according to an eighth example of the present invention. The configuration of the apparatus 800 is the same as that of the apparatus 700 shown in FIG. 12 except that a video/sound compression section 21 is additionally provided and the unit thin-out section 45 is replaced by a pair of sections consisting of a video/sound expansion section 41 and a unit thin-out section 46. Therefore, the same components will be identified by the same reference numerals and the description thereof will be omitted herein.

The video/sound compression section 21 compresses the video and the sound output from the broadcast receiving section 10 by a predetermined method. The video/sound expansion section 41 expands the video and the sound output from the video/sound reproducing section 40 by a predetermined method. The unit thin-out section 46 performs a thin-out processing in collaboration with the video/sound expansion section 41. For example, in the case where a compression method for performing an interframe or an inter-field coding such as MPEG1 or MPEG2 is employed, the function of the unit thin-out section 46 and the function of the video/sound expansion section 41 are accomplished only by expanding a number I of frames, because the expansion and the unit thin-out can be simultaneously performed by expanding only the I frames and outputting. As a result, it is possible to efficiently perform the unit thin-out.

In the eighth example, not only the effects of the seventh example can be attained, but also the amount of data to be recorded in the memory section 30 can be reduced by compressing the output from the broadcast receiving section 10. As a result, it is possible to use a less expensive memory device having a lower data transmission rate and a smaller memory capacity than that of the seventh example as the memory section 30. In the case of using the same memory section 30 as that of the seventh example in this eighth example, it is possible to considerably increase the recordable time of the memory section 30.

EXAMPLE 9

Figure 14:
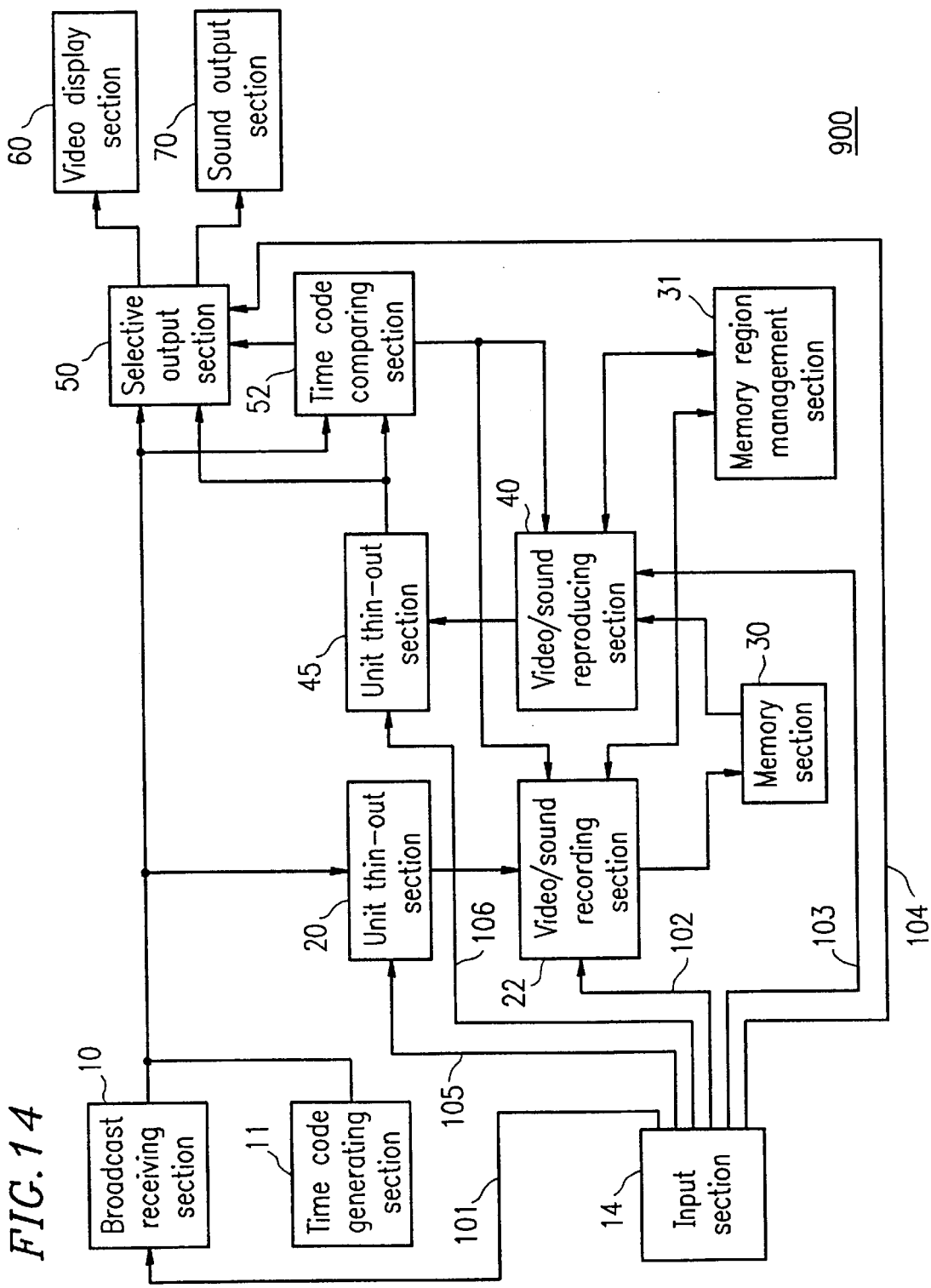
FIG. 14 is a block diagram showing a configuration for an apparatus 900 for recording and reproducing video and sound according to a ninth example of the present invention.

FIG. 14 shows a configuration for an apparatus 900 for recording and reproducing video and sound according to a ninth example of the present invention. The configuration of the apparatus 900 is the same as that of the apparatus 700 shown in FIG. 12 except that a unit thin-out section 20 is additionally provided prior to the video/sound recording section 22 for the apparatus 900. Therefore, the same components will be identified by the same reference numerals and the description thereof will be omitted herein.

The apparatus 900 performs thin-out processing during both the recording operation and the reproduction operation.

The unit thin-out section 20 thins out the video and the sound output from the broadcast receiving section 10 at a predetermined ratio during the recording operation. The predetermined ratio is input from the input section 14 to the unit thin-out section 20 via a line 105. The video and sound thinned out by the unit thin-out section 20 are recorded in the memory section 30.

The unit thin-out section 45 thins out the video and the sound reproduced by the video/sound reproducing section 40 at a predetermined ratio during the reproduction operation. The predetermined ratio is input from the input section 14 to the unit thin-out section 45 via a line 106. The video and sound thinned out by the unit thin-out section 45 are supplied to the time code comparing section 52. The thin-out ratio in the unit thin-out section 20 and the thin-out ratio in the unit thin-out section 45 can be adjusted independently.

In the ninth example, not only the effects of the seventh example can be attained, but also the amount of data to be recorded in the memory section 30 can be reduced by recording the thinned out video and sound in the memory section 30. As a result, it is possible to use a less expensive memory device having a lower data transmission rate and a smaller memory capacity than that of the seventh example as the memory section 30. In the case of using the same memory section 30 as that of the seventh example in this ninth example, it is possible to considerably increase the recordable time of the memory section 30.

EXAMPLE 10

Figure 15:
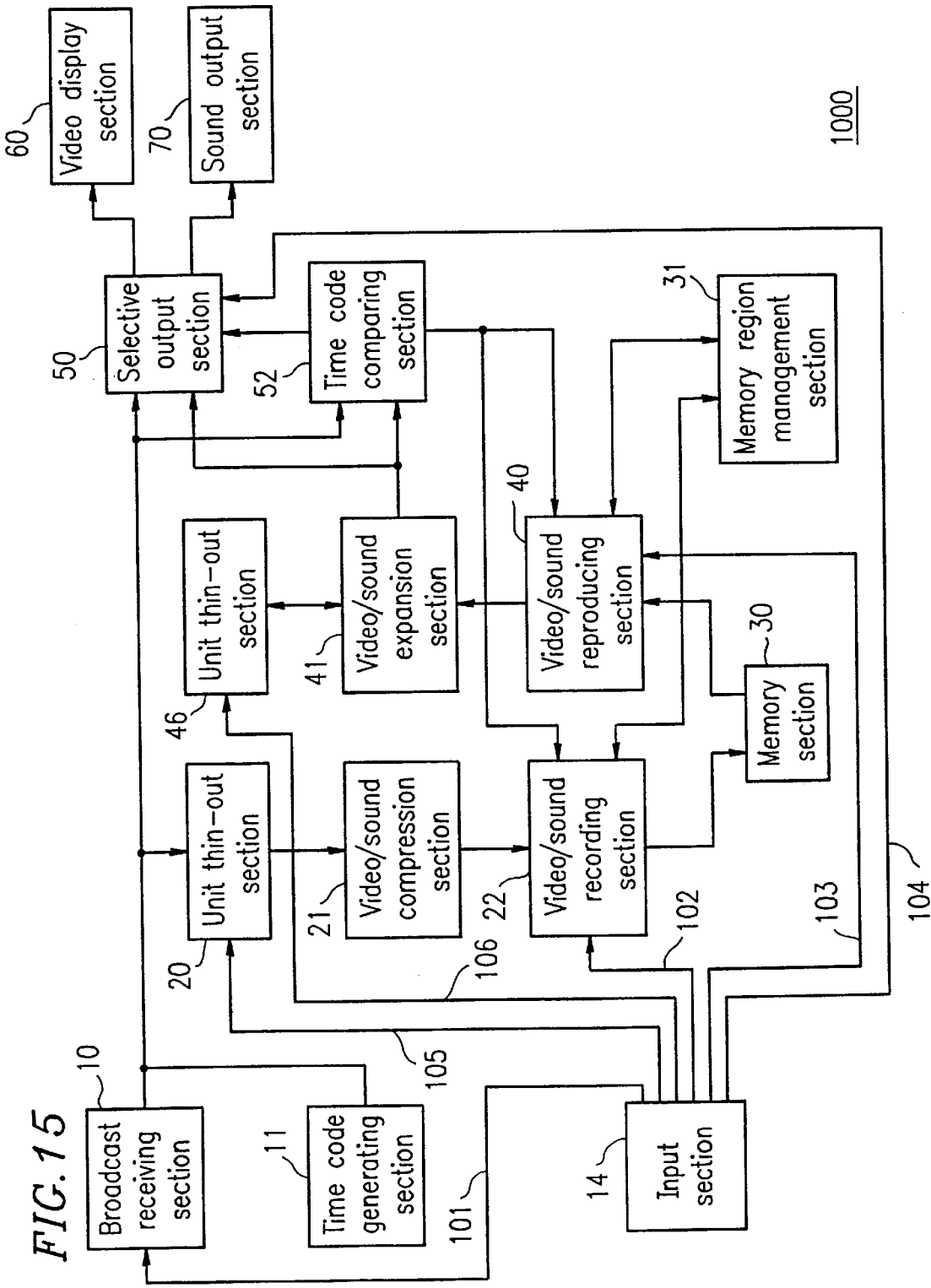
FIG. 15 is a block diagram showing a configuration for an apparatus 1000 for recording and reproducing video and sound according to a tenth example of the present invention.
Figure 16:
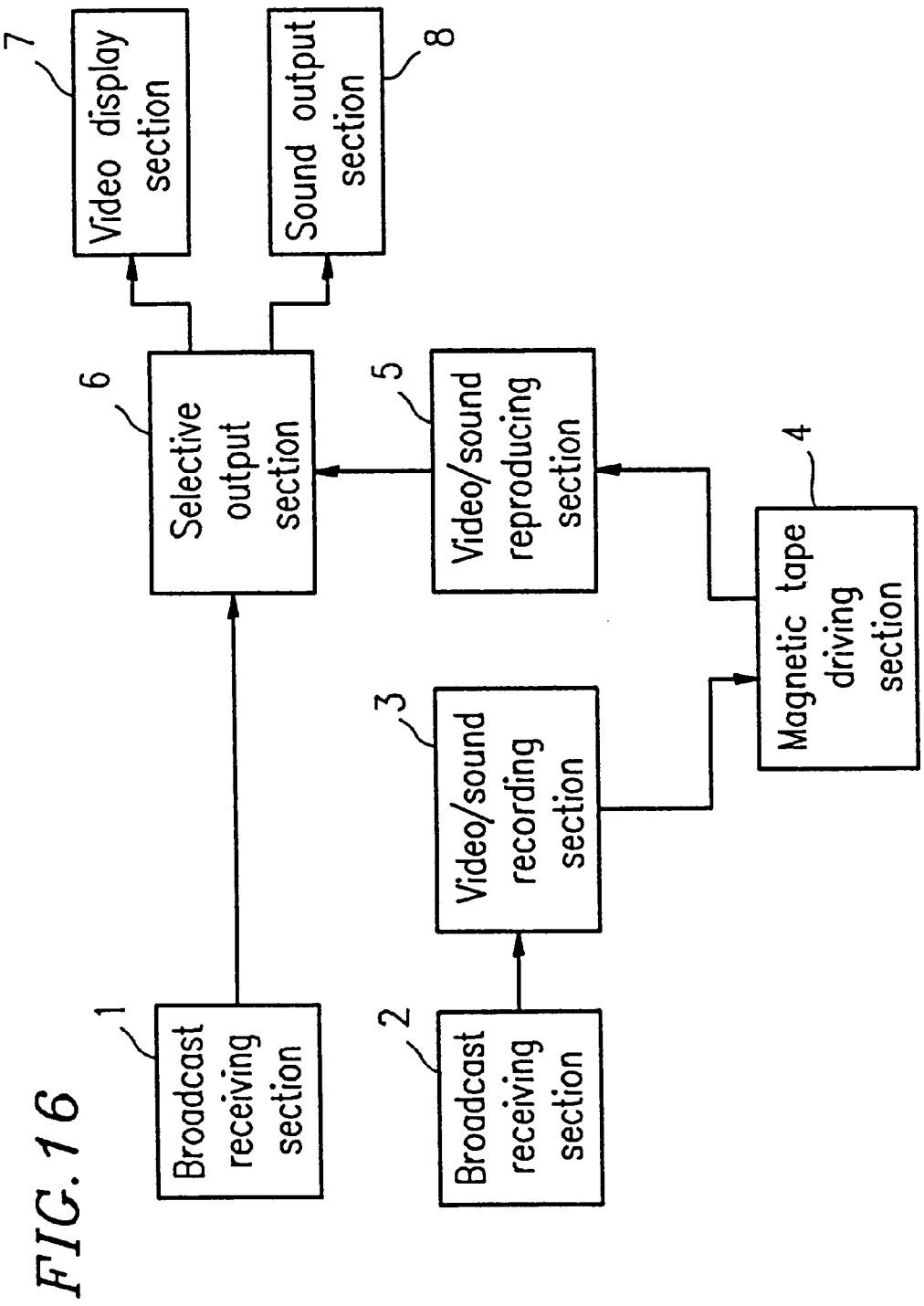
FIG. 16 is a block diagram showing a configuration for a conventional apparatus for recording and reproducing video and sound.

FIG. 15 shows a configuration for an apparatus 1000 for recording and reproducing video and sound according to a tenth example of the present invention. The configuration of the apparatus 1000 is the same as that of the apparatus 900 shown in FIG. 14 except that a video/sound compression section 21 is additionally provided and the unit thin-out section 45 is replaced by a pair of sections consisting of a video/sound expansion section 41 and a unit thin-out section 46. Therefore, the same components will be identified by the same reference numerals and the description thereof will be omitted herein.

The video/sound compression section 21 compresses the video and the sound output from the broadcast receiving section 10 by a predetermined method. The video/sound expansion section 41 expands the video and the sound output from the video/sound reproducing section 40 by a predetermined method. The unit thin-out section 46 performs thin-out processing in collaboration with the video/sound expansion section 41. For example, in the case where a compression method for performing an interframe or an inter-field coding such as MPEG1 or MPEG2 is employed, the function of the unit thin-out section 46 and the function of the video/sound expansion section 41 are accomplished only by expanding a number I of frames, because the expansion and the unit thin-out can be simultaneously performed by expanding only the I frames and outputting. As a result, it is possible to efficiently perform unit thin-out.

In the tenth example, not only the effects of the ninth example can be attained, but also the amount of data to be recorded in the memory section 30 can be reduced by compressing the output from the broadcast receiving section 10. As a result, it is possible to use a less expensive memory device having a lower data transmission rate and a smaller memory capacity than that of the ninth example as the memory section 30. In the case of using the same memory section 30 as that of the ninth example in this tenth example, it is possible to considerably increase the recordable time of the memory section 30.

In all the foregoing Examples 1 to 10, all of the components can be embodied in physical devices. Alternatively, it is also possible to realize the functions of these components by using software controllable by a CPU. Those skilled in the art should readily understand that the functions other than that of the broadcast receiving section 10 and that of the memory section 30, in particular, can be easily realized by software.

According to the present invention, it is possible to realize a "time-shift reproduction" function, during recording a program now being broadcasted, of reproducing the program from the beginning while continuing recording the program. As a result, in the case where watching and listening of a program now being broadcasted must be suspended, it is possible to restart to watch and listen to the program later from the point where watching and listening of the program was suspended. In addition, such a "time-shift reproduction" function corresponding to multiple channels is also realizable.

Moreover, according to the present invention, it is also possible to realize a "time-shift fast-forward reproduction" function. As a result, in the case where watching and listening of a program now being broadcasted must be suspended, it is possible to restart to watch and listen to the program later from the point where watching and listening of the program was suspended. By thinning out data during the recording operation, the amount of data to be recorded in the memory section 30 can be reduced. In addition, by thinning out data during the reproduction operation, it is possible to freely set or change the reproduction speed during the reproduction operation. As a result, it is possible to easily perform a reproduction operation satisfying the users' needs.

Furthermore, by compressing data during the recording operation and by expanding data during the reproduction operation, the amount of data to be recorded in the memory section 30 can be reduced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An apparatus for recording and reproducing data of a plurality of channels, comprising:
   receiving means for receiving input data of a N number of channels;
   first selection means for selecting a M number of channels among the N number of channels;
   recording means for recording on a recording medium the input data of the M number of channels selected by the first selection means;
   managing means for managing information indicating a position of the input data of the M number of channels currently being recorded on the recording medium, and for managing information indicating a position of the input data of the M number of channels which has previously been recorded;

second selection means for selecting a P number of channels from among a plurality of channels previously recorded on the recording medium and the M number of channels which are currently being recorded;

reproducing means, operative simultaneously with the recording means to reproduce data while the recording means is recording data, for reproducing the data of the P number of channels selected by the second selection means from among the plurality of channels previously recorded on the recording medium and the M number of channels which are currently being recorded, based on the information managed by the managing means, during recording of the input data of the M number of channels selected for current recording on the recording medium; and selective output means for selectively outputting at least one of the input data of the N number of channels which has not been recorded initially on the recording medium and the data of the P number of channels reproduced by the reproducing means, wherein N, M and P are positive integers and wherein $N \geq M$, $N \geq 2$ and $P \geq 2$.

2. An apparatus according to claim 1, further comprising compression means for compressing the input data and expansion means for expanding the data reproduced by the reproducing means.

3. An apparatus according to claim 1, wherein the selective output means comprises means for applying a priority order to each of the input data and the reproduced data, and wherein the apparatus further comprises display means for displaying an output from the selective output means in a predetermined mode, the predetermined mode being changed in accordance with the priority order.

4. The apparatus of claim 1, wherein the recording medium includes an optical disk or a random access memory.

5. A method for recording and reproducing data of a plurality of channels, comprising the steps of:

(a) receiving input data of a N number of channels;

(b) selecting a M number of channels among the N number of channels;

(c) recording on a recording medium the input data of the M number of channels selected in the step (b);

(d) managing information indicating a position of the input data of the M number of channels currently being recorded on the recording medium, and managing information indicating a position of the input data of the M number of channels which has previously been recorded;

(e) selecting a P number of channels from among a plurality of channels previously recorded on the recording medium and the M number of channels which are currently being recorded;

(f) reproducing, simultaneously with the recording of data, the data of the P number of channels selected in the step (e) from among the plurality of channels previously recorded on the recording medium and the M number of channels which are currently being recorded, based on the information managed in the step (d), during recording of the input data of the M number of channels selected for current recording on the recording medium; and (g) selectively outputting at least one of the input data of the N number of channels which has not been recorded initially on the recording medium and the reproduced data of the P number of channels, wherein N, M and P are positive integers and wherein $N \geq M$, $N \geq 2$ and $P \geq 2$.

6. A method according to claim 5, further comprising a step of compressing the input data and a step of expanding the reproduced data.

7. A method according to claim 5, wherein the step (g) comprises a step of applying a priority order to each of the input data and the reproduced data, and wherein the method further comprises a step of displaying the selective output in the step (g) in a predetermined mode, the predetermined mode being changed in accordance with the priority order.

8. The method of claim 5, wherein the recording medium includes an optical disk or a random access memory.

* * * * *